United States Patent
Tsukuda

(10) Patent No.: US 11,509,220 B2
(45) Date of Patent: Nov. 22, 2022

(54) ELECTRONIC DEVICE WITH REDUCED PARASITIC INDUCTANCE

(71) Applicant: RENESAS ELECTRONICS CORPORATION, Tokyo (JP)

(72) Inventor: Tatsuaki Tsukuda, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 318 days.

(21) Appl. No.: 16/853,082

(22) Filed: Apr. 20, 2020

(65) Prior Publication Data

US 2020/0412245 A1 Dec. 31, 2020

(30) Foreign Application Priority Data

Jun. 27, 2019 (JP) .............................. JP2019-119880

(51) Int. Cl.
*H02M 3/158* (2006.01)
*H02M 3/00* (2006.01)

(52) U.S. Cl.
CPC ............ *H02M 3/158* (2013.01); *H02M 3/003* (2021.05)

(58) Field of Classification Search
CPC ........ H02M 3/003; H02M 3/158; H02M 1/44; H01L 23/49838; H01L 23/642; H01L 23/645
See application file for complete search history.

(56) References Cited

U.S. PATENT DOCUMENTS

| 7,554,181 | B2 | 6/2009 | Satou et al. |
| 10,490,484 | B2 | 11/2019 | Nishiyama |
| 2003/0151447 | A1* | 8/2003 | Moriconi ............ H02M 3/1588 327/536 |
| 2018/0247887 | A1* | 8/2018 | Park ...................... H01L 23/145 |

FOREIGN PATENT DOCUMENTS

| JP | 2005-294464 A | 10/2005 |
| JP | 2018-200953 A | 12/2018 |

OTHER PUBLICATIONS

A. Bhargava, D. Pommerenke, K. W. Kam, F. Centola and C. W. Lam, "DC-DC Buck Converter EMI Reduction Using PCB Layout Modification," in IEEE Transactions on Electromagnetic Compatibility, vol. 53, No. 3, pp. 806-813, Aug. 2011, doi: 10.1109/TEMC.2011.2145421. (Year: 2011).*

* cited by examiner

*Primary Examiner* — Peter M Novak
(74) *Attorney, Agent, or Firm* — McDermott Will & Emery LLP

(57) ABSTRACT

An electronic device comprises a switching regulator. Here, the switching regulator has a first wiring portion (including a parasitic inductance) coupling the high-side element and the low-side element, and a second wiring portion (including a parasitic inductance) coupled with the low-side element. Also, the switching regulator has a first region in where the first wiring portion and the second wiring portion are lined up with each other. As a result, the performance of the electronic device can be improved.

15 Claims, 18 Drawing Sheets

| ELECTRIC POWER STABILIZATION CAPACITOR (μF) | REAL NUMBER (UNIT) | NOISE SUPPRESSION CAPACITOR (μF) | REAL NUMBER (UNIT) |
|---|---|---|---|
| 0.01 | 0 | 0.01 | 1 |
| 0.1 | 0 | 0.1 | 6 |
| 1 | 1 | 1 | 1 |
| 10 | 1 | 10 | 1 |
| TOTAL | 2 | TOTAL | 9 |

| ELECTRIC POWER STABILIZATION CAPACITOR (μF) | REAL NUMBER (UNIT) | NOISE SUPPRESSION CAPACITOR (μF) | REAL NUMBER (UNIT) |
|---|---|---|---|
| 0.01 | 0 | 0.01 | 0 |
| 0.1 | 0 | 0.1 | 0 |
| 1 | 1 | 1 | 0 |
| 10 | 1 | 10 | 0 |
| TOTAL | 2 | TOTAL | 0 |

# ELECTRONIC DEVICE WITH REDUCED PARASITIC INDUCTANCE

CROSS-REFERENCE TO RELATED APPLICATIONS

The disclosure of Japanese Patent Application No. 2019-119880 filed on Jun. 27, 2019 including the specification, drawings and abstract is incorporated herein by reference in its entirety.

BACKGROUND

The present invention relates to an electronic device, for example, the present invention relates to a technique useful for application to an electronic device including a switching regulator.

There are disclosed techniques listed below.
[Patent Document 1] Japanese Unexamined Patent Application Publication No. 2005-294464
[Patent Document 2] Japanese Unexamined Patent Application Publication No. 2018-200953

Patent Document 1 discloses a technique for downsizing a non-insulated DC-DC converter and improving a voltage conversion efficiency.

Patent Document 2 discloses a technique for improving the performance of an electronic device.

SUMMARY

A switching regulator typified by DC-DC converter is configured to output a desired voltage by periodically activating a switch.

In this manner, the switching regulator performs the switching operation, and an electric current is switched ON/OFF by the switching operation.

Therefore, when a large parasitic inductance exists in the switching regulator, the high-frequency noise generated by changing the electric current based on the switching operation becomes large.

As a result, the switching regulator becomes a source of a large-scaled high-frequency noise, which adversely affects an electronic component arranged in the periphery. Therefore, it is desired to reduce the high-frequency noise generated from the switching regulator.

Other objects and novel features will become apparent from the description of this specification and the accompanying drawings.

An electronic device according to one embodiment, comprises: a switching regulator. Here, the switching regulator includes: a first wiring portion coupling the high-side element and the low-side element with each other, and a second wiring portion coupled with the low-side element. Also, the switching regulator has a first region in where the first wiring portion and the second wiring portion are lined up with each other. Also, an operation period of the switching regulator includes: an ON period that turns on the high-side element and that turns off the low-side element, a transition period that turns on the high-side element and that turns on the low-side element, and an OFF period that turns off the high-side element and that turns on the low-side element. Here, in the first region, a direction of an electric current flowing the first wiring portion at each of the transition period and the OFF period and a direction of an electric current flowing the second wiring portion at each of the transition period and the OFF period are opposite to each other.

DETAILED DESCRIPTION

Figure 1:
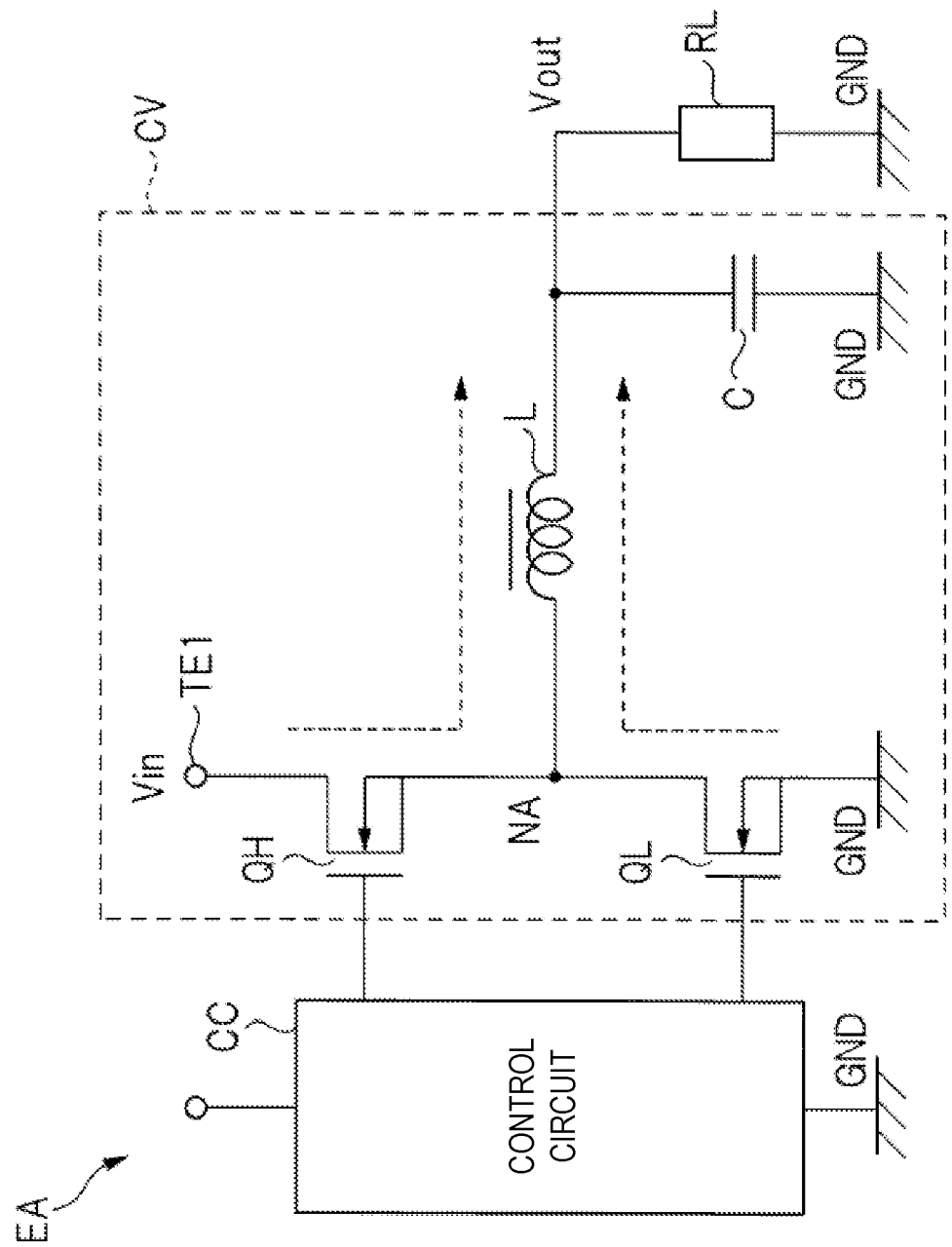
FIG. 1 is a diagram showing a circuit configuration of the electronic device.

In the following embodiments, when required for convenience, the description will be made by dividing into a plurality of sections or embodiments, but except when specifically stated, they are not independent of each other, and one is related to the modified example, detail, supplementary description, or the like of part or all of the other.

In the following embodiments, the number of elements, etc. (including the number of elements, numerical values, quantities, ranges, etc.) is not limited to the specific number, but may be not less than or equal to the specific number, except for cases where the number is specifically indicated and is clearly limited to the specific number in principle.

Furthermore, in the following embodiments, it is needless to say that the constituent elements (including element steps and the like) are not necessarily essential except in the case where they are specifically specified and the case where they are considered to be obviously essential in principle.

Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above numerical values and ranges.

In all the drawings for explaining the embodiments, the same members are denoted by the same reference numerals in principle, and repetitive descriptions thereof are omitted. Note that even plan view may be hatched for the sake of clarity.

The technical idea in the present embodiment can be widely applied to various types of switching regulators. That is, the technical idea in the present embodiment can be applied to a switching regulator of a DC-DC conversion system or a switching regulator of an AC/DC conversion system. Further, the technical idea in the present embodiment can be applied to any of a step-down type, a step-up type, and an inversion type switching regulator.

Hereinafter, the step-down type DC-DC converter will be described as an exemplary switching regulator to which the technical idea of present embodiment is applied.

<Circuit Configuration and Operation of Dc-Dc Converter>

FIG. 1 is a diagram showing a circuit configuration of a step-down type DC-DC converter CV. As shown in FIG. 1, in the step-down type DC-DC converter CV, the high-side MOS transistor QH and the low-side MOS transistor QL are connected in series between the input terminal TE1 and the ground (reference potential) GND. The inductor L and the load RL are coupled in series between the node NA between the high-side MOS transistor QH and the low-side MOS transistor QL and the ground GND on the load RL side, and the capacitor C is coupled in parallel with the load RL.

The gate electrode of the high-side MOS transistor QH and the gate electrode of the low-side MOS transistor QL are connected to the control circuit CC, and the ON/OFF operation of the high-side MOS transistor QH and the ON/OFF operation of the low-side MOS transistor QL are controlled by the control circuit CC. Specifically, the control circuit CC controls the low-side MOS transistor QL to be turned off when the high-side MOS transistor QH is turned on, and controls the low-side MOS transistor QL to be turned on when the high-side MOS transistor QH is turned off.

Here, for example, when the high-side MOS transistor QH is turned on and the low-side MOS transistor QL is turned off, an electric current flows from the input terminal TE1 to the load RL through the high-side MOS transistor QH and the inductor L. Thereafter, when the high-side MOS transistor QH is turned off and the low-side MOS transistor QL is turned on, first, the high-side MOS transistor QH is turned off, so that the electric current flowing from the input terminal TE1 to the load RL through the high-side MOS transistor QH and the inductor L is cut off. That is, the electric current flowing through the inductor L is cut off.

However, in the inductor L, when the current is reduced, the electric current flowing through the inductor L is attempted to be maintained. At this time, since the low-side MOS transistor QL is turned on, an electric current flows from the ground GND to the load RL via the low-side MOS transistor QL and the inductor L. Thereafter, the high-side MOS transistor QH is turned on and the low-side MOS transistor QL is turned off again. By repeating such an operation, in the step-down type DC-DC converter CV shown in FIG. 1, when the input voltage Vin is input to the input terminal TE1, the output voltage Vout lower than the input voltage Vin is output to both ends of the load RL.

Hereinafter, the reason why the output voltage Vout lower than the input voltage Vin is output to both ends of the load RL when the input voltage Vin is input to the input terminal TE1 by repeating the above-described switching operation will be briefly described. In the following description, it is assumed that the electric current flowing through the inductor L is not intermittent.

First, the high-side MOS transistor QH, the control by the control circuit CC, it is assumed that the switching operation in the ON period $T_{ON}$ and OFF period $T_{OFF}$. The switching frequency is $f=1/(T_{ON}+T_{OFF})$.

Here, for example, in FIG. 1, the capacitor C inserted in parallel with the load RL has a function of not greatly changing the output voltage Vout in a short time. That is, in the step-down type DC-DC converter CV shown in FIG. 1, since the capacitor C having a relatively large capacitance value is inserted in parallel with the load RL, the ripple voltage included in the output voltage Vout is smaller than the output voltage Vout in the steady-state. For this reason, it is assumed that the variation of the output voltage Vout within one cycle of the switching operation is negligible.

First, a case where the high-side MOS transistor QH is turned on will be considered. At this time, since it is assumed that the output voltage Vout does not fluctuate within one cycle, the voltage applied to the inductor L can be considered to be constant in Vin-Vout. As a result, when the inductance of the inductor L is L1, the increment $\Delta I_{ON}$ of the current in the ON period $T_{ON}$ is given by Equation (1).

$$\Delta I_{ON} = (V\text{in} - V\text{out})/L1 \times T_{ON} \tag{1}$$

Next, a case that the high-side MOS transistor QH is off is considered. In this case, since the low-side MOS transistor QL is turns on, the voltage applied to the inductor L becomes 0-Vout=−Vout. Therefore, the increment $\Delta I_{OFF}$ of the electric current during the OFF period $T_{OFF}$ is given by Equation (2).

$$\Delta I_{OFF} = -V\text{out}/L1 \times T_{OFF} \tag{2}$$

Here, when the steady state, the electric current flowing through the inductor L will not increase or decrease during one period of the switching operation. In other words, if the electric current flowing through the inductor L increases or decreases during one cycle, it means that the steady state has not yet been reached. Therefore, the steady state holds for the following Equation (3).

$$\Delta I_{ON} + \Delta I_{OFF} = 0 \tag{3}$$

Also, by substituting each of the relationship of Equation (1) and the relationship of Equation (2) into Equation (3), it possible to obtain Equation (4) shown below.

$$V\text{out} = V\text{in} \times T_{ON}/(T_{ON}+T_{OFF}) \tag{4}$$

In this Equation (4), since $T_{ON}$ is 0 or more, and $T_{OFF}$ is 0 or more, it can be seen that Vout<Vin. That is, the step-down type DC-DC converter CV shown in FIG. 1 is a circuit that outputs an output voltage Vout lower than the input voltage Vin. Then, by controlling the switching operation by the control circuit CC from Equation (4), it can be seen that it is possible to obtain any output voltage Vout lower than the input voltage Vin by changing the ON period $T_{ON}$ and OFF period $T_{OFF}$. In particular, if the ON period $T_{ON}$ and the OFF period $T_{OFF}$ are controlled to be constant, a constant output voltage Vout can be obtained.

As described above, according to the step-down type DC-DC converter CV shown in FIG. 1, the control circuit CC controls the ON/OFF operation of the high-side MOS transistor QH and the ON/OFF operation of the low-side MOS transistor QL to output the output voltage Vout lower than the input voltage Vin.

In this specification, in FIG. 1, a component surrounded by a broken line is a step-down type DC-DC converter CV which is an exemplary switching regulator, and an electronic device EA is formed by combining the step-down type DC-DC converter CV and the control circuit CC.

Figure 2:
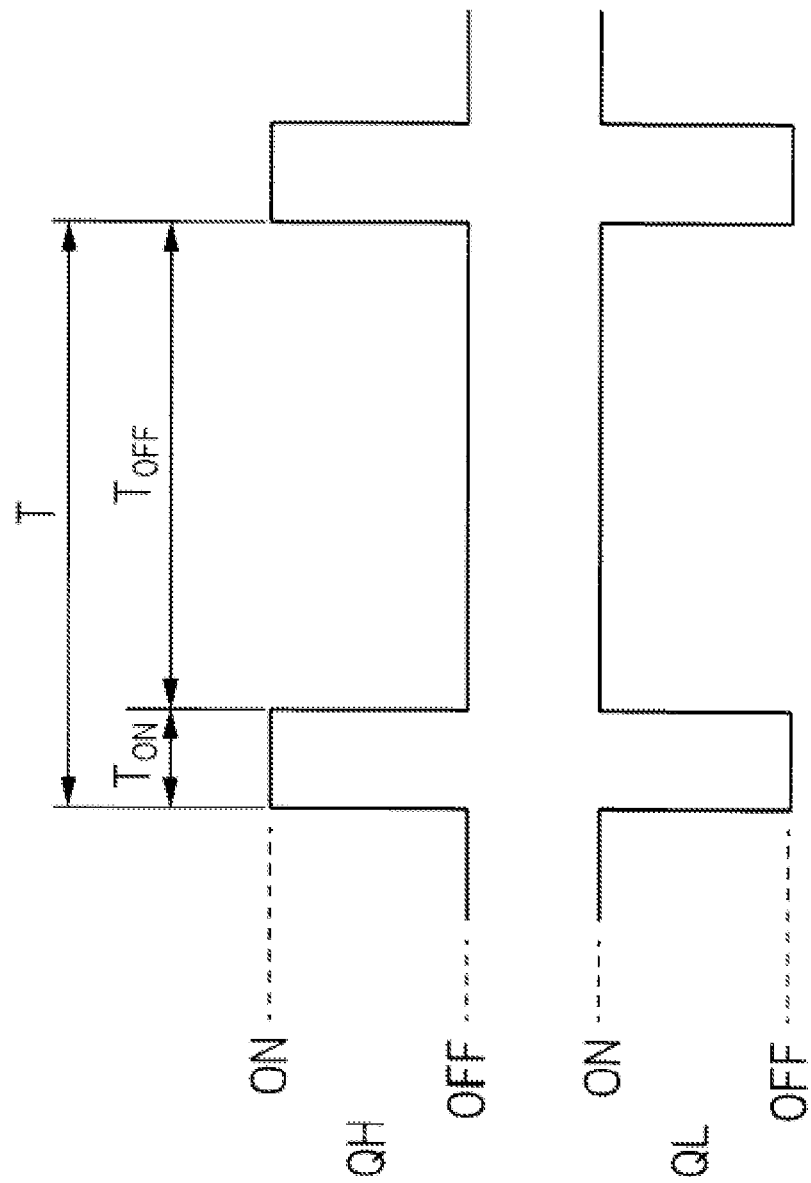
FIG. 2 is a timing chart of each of a high-side MOS transistor and a low-side MOS transistor.

FIG. 2 is a timing chart of each of the high-side MOS transistor QH and the low-side MOS transistor QL. In FIG. 2, the ON period $T_{ON}$ indicates the time during which the high-side MOS transistor QH is turned on, and the OFF period $T_{OFF}$ indicates the time during which the high-side MOS transistor QH is turned off. Here, as shown in FIG. 2, it is understood that the low-side MOS transistor QL is turned off when the high-side MOS transistor QH is turned on, and the low-side MOS transistor QL is turned on when the high-side MOS transistor QH is turned off. Therefore, it can be said that the ON period $T_{ON}$ indicates the time during which the low-side MOS transistor QL is turned off, and the OFF period $T_{OFF}$ indicates the time during which the low-side MOS transistor QL is turned on.

Here, as shown in the above Equation (4), when the output voltage Vout is sufficiently lower than the input voltage Vin, the ON period $T_{ON}$ is shortened. In other words, in order to sufficiently lower the output voltage Vout with respect to the input voltage Vin, the OFF period $T_{OFF}$ needs to be lengthened. Therefore, considering that the output voltage Vout is sufficiently lower than the input voltage Vin, the control circuit CC needs to control the high-side MOS transistor QH by the control circuit CC so that the OFF period $T_{OFF}$ during which the high-side MOS transistor QH is off becomes longer. In other words, a longer OFF period $T_{OFF}$ during which the high-side MOS transistor QH is off means a longer on period of the low-side MOS transistor QL. Therefore, in particular, when the output voltage Vout is sufficiently low, the ON period of the low-side MOS transistor QL becomes long, so that the ON resistance of the low-side MOS transistor QL needs to be sufficiently small in view of improving the efficiency of DC-DC converter.

EXPLANATION OF RELATED ART

As described above, for example, the step-down type DC-DC converter CV are configured to output a desired voltage by periodically repeating switching operations. In the switching operation, the current is switched ON/OFF.

Therefore, when the parasitic inductances existing in the step-down type DC-DC converter CV are large, the high-frequency noises generated by the current changes caused by the switching operation become large. As a result, the step-down type DC-DC converter CV become a large source of high-frequency noises, which adversely affects electronic components arranged in the periphery of the step-down type DC-DC converter CV.

Therefore, it is desired to reduce high-frequency noises generated from the step-down type DC-DC converter. In this regard, there is a related art for reducing high frequency noise. Therefore, in the following, first, this related art will be described.

The "related art" referred to in the present specification is a technology having a problem newly found by the inventor, and is not a known prior art, but is a technology described with the intention of a prerequisite technology (unknown technology) of a new technical idea, although it is not a known prior art.

Figure 3:
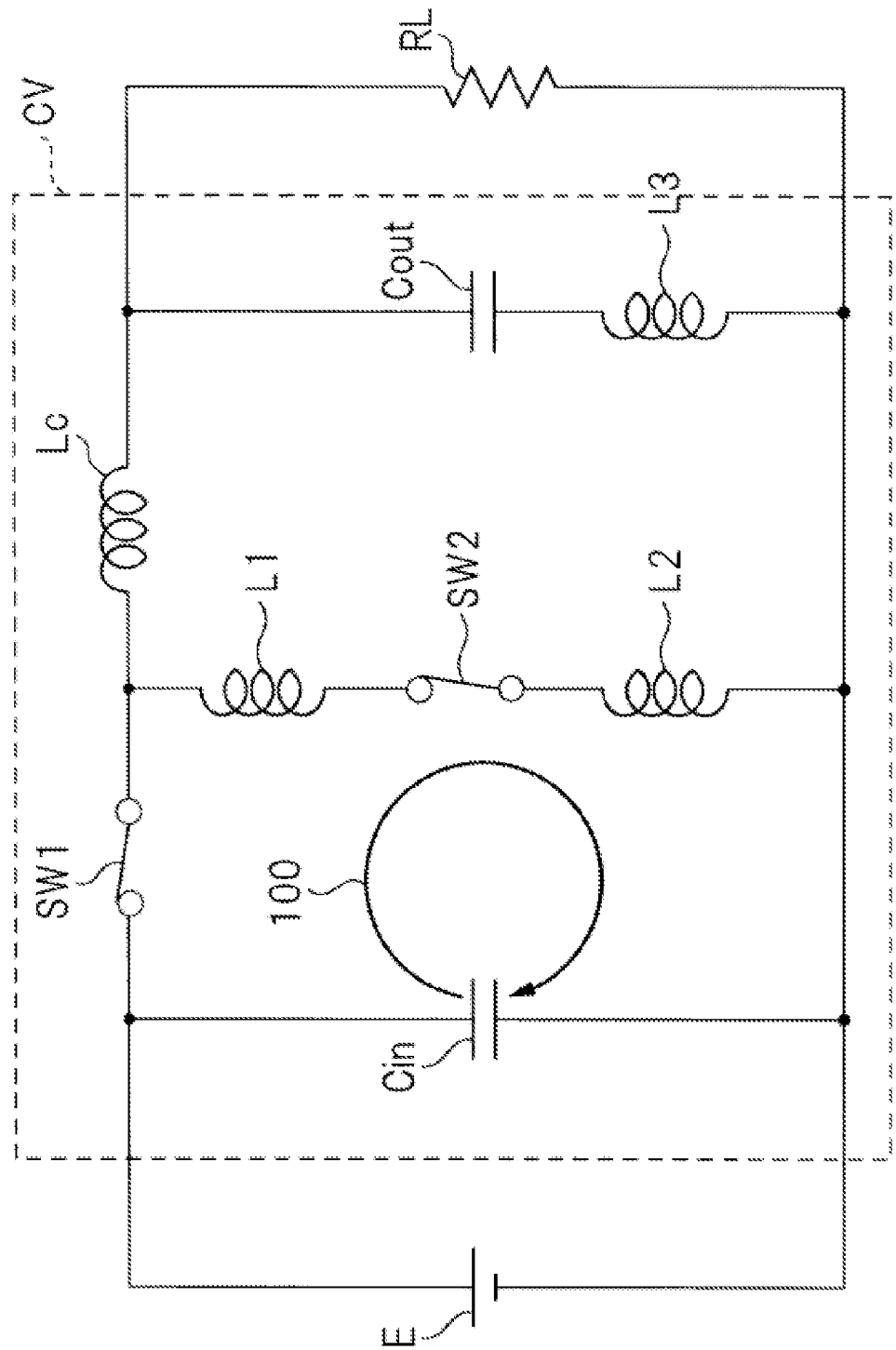
FIG. 3 is a circuit diagram showing a step-down (buck) type DC-DC converter according to the related art.

FIG. 3 is a circuit diagram showing a configuration of the step-down type DC-DC converter CV according to the related art.

In FIG. 3, a step-down type DC-DC converter CV in the related art is connected to a power supply E for supplying an input voltage, and an input capacitor Cin is connected in parallel with the power supply E. Between the power supply potential of the power supply E and the ground potential (reference potential) of the power supply E, for example, a high-side element SW1 and a low-side element SW2 formed of a field-effect transistor (MOS transistor) are connected in series. At this time, each of the high-side element SW1 and the low-side element SW2 functions as a switching element. Since the high-side element SW1 and the low-side element SW are connected to each other by, for example, a wiring pattern, the parasitic inductance L1 existing in the wiring pattern are illustrated in FIG. 3. Similarly, since the low-side element SW is connected to the wiring pattern to which the ground potential is to be supplied, FIG. 3 also shows the parasitic inductance L2 present in the wiring pattern to which the ground potential is to be supplied.

Next, in FIG. 3, an inductor Lc is connected to a connecting node between the high-side element SW1 and the low-side element SW2, and a load RL is connected between the inductor Lc and a wiring pattern to which a ground potential is to be supplied. That is, the step-down type DC-DC converter CV are configured to generate an output voltage between the inductor Lc and the interconnect patterns to which the ground potential is to be supplied, and the output voltage is applied to the loads RL. Since the output capacitor Cout is connected in parallel with the load RL and the output capacitor Cout is connected to the wiring pattern to which the ground potential is to be supplied, the parasitic inductances L3 present in the wiring pattern are illustrated in FIG. 3. As described above, the circuits of the step-down type DC-DC converter CV in the related art are configured.

In the step-down type DC-DC converter CV according to the related art, the switching operation is performed in each of the high-side element SW1 and the low-side element SW2. Specifically, the ON/OFF operation of turning on the high-side element SW1 and turning off the low-side element SW2 and the OFF/ON operation of turning off the high-side element SW1 and turning on the low-side element SW2 are repeated. Here, there actually exists a transition period in which the high-side element SW1 and the low-side element SW2 are simultaneously turned on between the ON/OFF operation and the OFF/ON operation. During the transition period, for example, in FIG. 3, as a result of the high-side element SW1 and the low-side element SW2 being simultaneously turned on, the power supply potential and the ground potential are short-circuited, and a large current flows between the power supply potential and the ground potential. Therefore, in consideration of the fact that the high-frequency noise (noise voltage) is represented by the product of the parasitic inductance and the current change, it can be understood that, for example, when the magnitude of the parasitic inductance L1 and the parasitic inductance L2 increases in FIG. 3, a large high-frequency noise is generated in the transition period. In particular, in the transition period, since a large current flows in a short time, the current change rate also increases, and high-frequency noise increases.

For this reason, in the step-down type DC-DC converter CV, it is particularly essential to reduce high-frequency noises generated during transition period. In this regard, since it is difficult to reduce the current change rate in order to reduce the high-frequency noise, it is important to reduce the magnitudes of the parasitic inductance L1 and the parasitic inductance L2 as small as possible in order to reduce the high-frequency noise in the transition period.

Therefore, in the related art, in order to minimize the magnitudes of the parasitic inductance L1 and the parasitic inductance L2 as much as possible, for example, a device is made to minimize the path length of the loop 100 shown in FIG. 3. This is because if the path length of the loop 100 shown in FIG. 3 can be minimized, the magnitudes of the parasitic inductance L1 and the parasitic inductance L2 can be reduced. That is, since the magnitude of the parasitic inductance L1 and the parasitic inductance L2 becomes smaller as the length of the wiring pattern becomes shorter, in the related art, the parasitic inductance L1 and the parasitic inductance L2 are attempted to be reduced by devising to minimize the path length of the loop 100 shown in FIG. 3. Specifically, in the related art, the path length of the loop 100 shown in FIG. 3 is minimized by devising the mounting layout.

Figure 4:
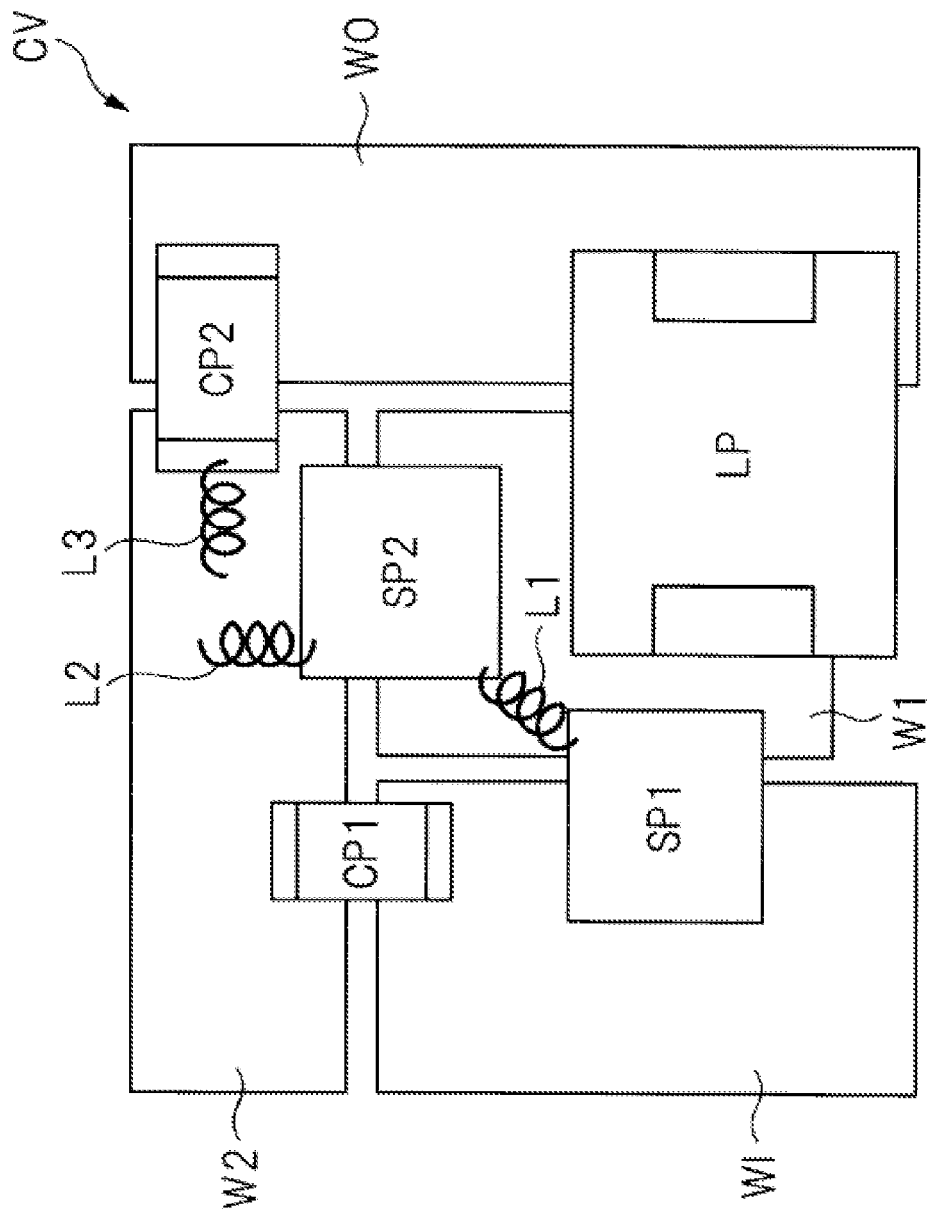
FIG. 4 is a plan view showing a mounting layout of step-down type DC-DC converter according to the related art.

FIG. 4 is a plan view showing a mounting layout of the step-down type DC-DC converter CV according to the related art. In FIG. 4, for example, an input pattern WI, an output pattern WO, a wiring pattern W1, and a wiring pattern W2 are formed on the wiring substrate. As shown in FIG. 4, a semiconductor component SP1 in which a high-side element is formed is mounted between the input pattern WI and the wiring pattern W1. Similarly, a semiconductor component SP2 in which a low-side element is formed is mounted between the wiring pattern W1 and the wiring pattern W2. In the related art, an inductor component LP is mounted between the wiring pattern W1 and the output pattern WO. Further, in the related art, a capacitive component CP1 in which an input capacitor is formed between the input pattern WI and the wiring pattern W2 is mounted, while a capacitive component CP2 in which an output capacitor is formed between the wiring pattern W2 and the output pattern WO is mounted.

In the step-down type DC-DC converter CV of the related art configured as described above, the semiconductor component SP1 in which the high-side element is formed and the semiconductor component SP2 in which the low-side element is formed are disposed close to each other. As a result, in the related art, for example, as shown in FIG. 4, the parasitic inductance L1 existing between the semiconductor component SP1 and the semiconductor component SP2 and the parasitic inductance L2 caused by the interconnect pattern W2 connected to the semiconductor component SP2 can be reduced. In this manner, according to the mounting layout in the related art, it is considered that the parasitic inductance L1 and the parasitic inductance L2 can be reduced.

However, even if the path length of the loop 100 shown in FIG. 3 is minimized, the parasitic inductance L1 and the parasitic inductance cannot be eliminated. That is, in the related art, the parasitic inductance L1 and the parasitic inductance L2 are rate-limited by the component size, resulting in a limit that can be reduced. That is, in the related art, it is difficult to reduce the high-frequency noise generated in the transition period to a predetermined amount or less. Therefore, in the related art, noise countermeasures such as a bypass capacitor and a snubber circuit for countermeasures against high-frequency noise are required in order to further reduce high-frequency noise. As a result, in the related art, an increase in the size of the electronic device and an increase in the manufacturing costs of the electronic device are caused by an increase in the number of components composing the step-down type DC-DC converter CV. That is, high-frequency noise countermeasures in the related art are insufficient. That is, there is room for improvement in the related art from the viewpoint of realizing sufficient measures against high-frequency noises without increasing the size and manufacturing costs of the electronic device composing the step-down type DC-DC converter CV. Therefore, present embodiment has devised measures to cope with the scope of improvements existing in the related art. Hereinafter, the technical idea in the present embodiment to which the present invention is applied will be described.

<Circuit Configuration of Step-Down Type Dc-Dc Converter According to Embodiment>

Figure 5:
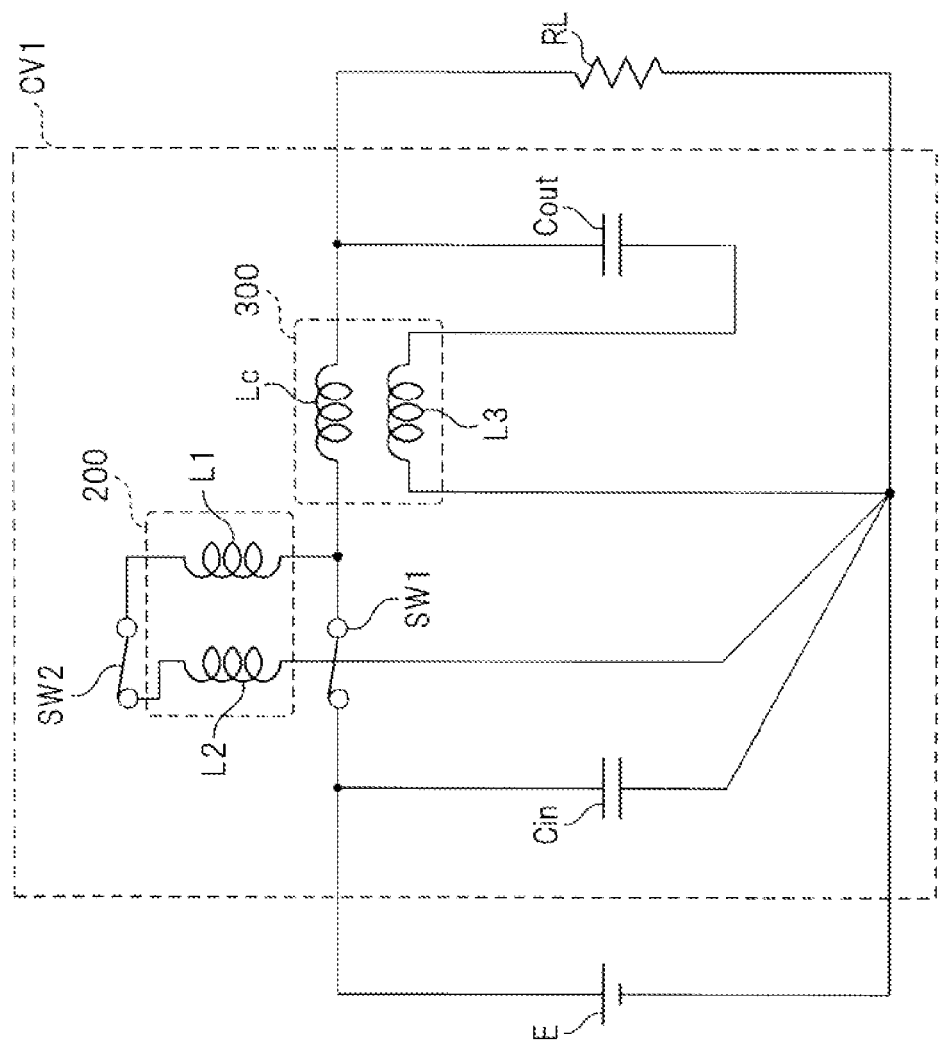
FIG. 5 is a circuit diagram showing a step-down type DC-DC converter according to an embodiment.

FIG. 5 is a circuit diagram showing a step-down (buck) type DC-DC converter CV1 according to the present embodiment.

In FIG. 5, a power supply E for supplying an input voltage to a step-down type DC-DC converter CV1 is connected to a step-down type DC-DC converter CV1 in the present embodiment, and an input capacitor C in is connected in parallel with the power supply E. The step-down type DC-DC converter CV1 in the present embodiment has a high-side element SW1 and a low-side element SW2 connected between a power supply potential and a ground potential. Here, in FIG. 5, the parasitic inductances L1 existing at the connecting portions between the high-side element SW1 and the low-side element SW2 are illustrated. FIG. 5 also shows the parasitic inductance L2 existing in the second wiring portion between the low-side device SW2 and the ground potential. Here, each of the high-side element SW1 and the low-side element SW2 is composed of, for example, a field-effect transistor MOSFET which is a switching element.

As shown in FIG. 5, in the step-down type DC-DC converter CV1 of present embodiment, the high-side element SW1 and the low-side element SW2 connected in series to each other are arranged so as to form closed loops in plan view. For example, as shown in FIG. 5, the high-side element SW1 and the low-side element SW2 are arranged to face each other. A wiring connecting the high-side element SW1 and the low-side element SW2 (a first wiring including the parasitic inductance L1) and a wiring connecting the low-side element SW2 and the ground potential (a second wiring including the parasitic inductance L2) are also disposed to face each other. In particular, the second wiring connecting the low-side element SW2 and the ground potential crosses the high-side element SW1 in plan view. This forms a closed loop in plan as shown in FIG. 5.

The first wiring coupling the high-side element SW1 and the low-side element SW2 with each other, and the second wiring coupled the low-side element SW2 and the ground potential with each other are configured to include a region 200 in where the first wiring and the second wiring are lined up with (more preferably, in parallel with) each other, by such a closed loop in a plan view. In particular, in the region 200, the first wiring and the second wiring are arranged close to each other such that a distance between the first wiring and the second wiring in the region 200 is the smallest distance, among distances between the first wiring and the second wiring.

Subsequently, as shown in FIG. 5, the step-down type DC-DC converter CV1 in the present embodiment includes an inductor Lc having one end connected to the connecting node between the high-side element SW1 and the low-side element SW2, and the other end of the inductor Lc is connected to the load RL. In particular, according to the step-down type DC-DC converter CV1 of present embodiment, an output voltage is output between the other end of the inductor Lc and the ground potential, and this output voltage is supplied to the loads RL. As shown in FIG. 5, the step-down type DC-DC converter CV1 of present embodiment also has an output capacitor Cout connected in parallel with the load RL. A parasitic inductance L3 exists in the wiring connecting the output capacitor Cout and the ground potential, and the wiring having the parasitic inductance L3 and the inductor Lc are arranged close to each other. That is, as shown in FIG. 5, the wiring having the parasitic inductance L3 is configured to include a region 300 that is parallel to the inductor Lc. As described above, the step-down type DC-DC converter CV1 in the present embodiment are configured.

<Circuit Operation of Step-Down Type Dc-Dc Converter According to Embodiment>

Next, the circuit operation of the step-down type DC-DC converter CV1 in this embodiment.

The step-down type DC-DC converter CV1 in the present embodiment performs a switching operation on each of the high-side element SW1 and the low-side element SW2 to generate an output voltage whose absolute value is lower than the input voltage from the input voltage. Specifically, the step-down type DC-DC converter CV1 in the present embodiment generates an output voltage lower than the input voltage by repeating an ON/OFF operation of turning on the high-side element SW1 and turning off the low-side element SW2, and an OFF/ON operation of turning off the high-side element SW1 and turning on the low-side element SW2. At this time, a transition period exists between the ON/OFF operation and the OFF/ON operation, and in this transition period, both the high-side element SW1 and the low-side element SW2 are simultaneously turned on, and as a result, a through current (short-circuit current) flows between the power supply potential and the ground potential.

Figure 6:
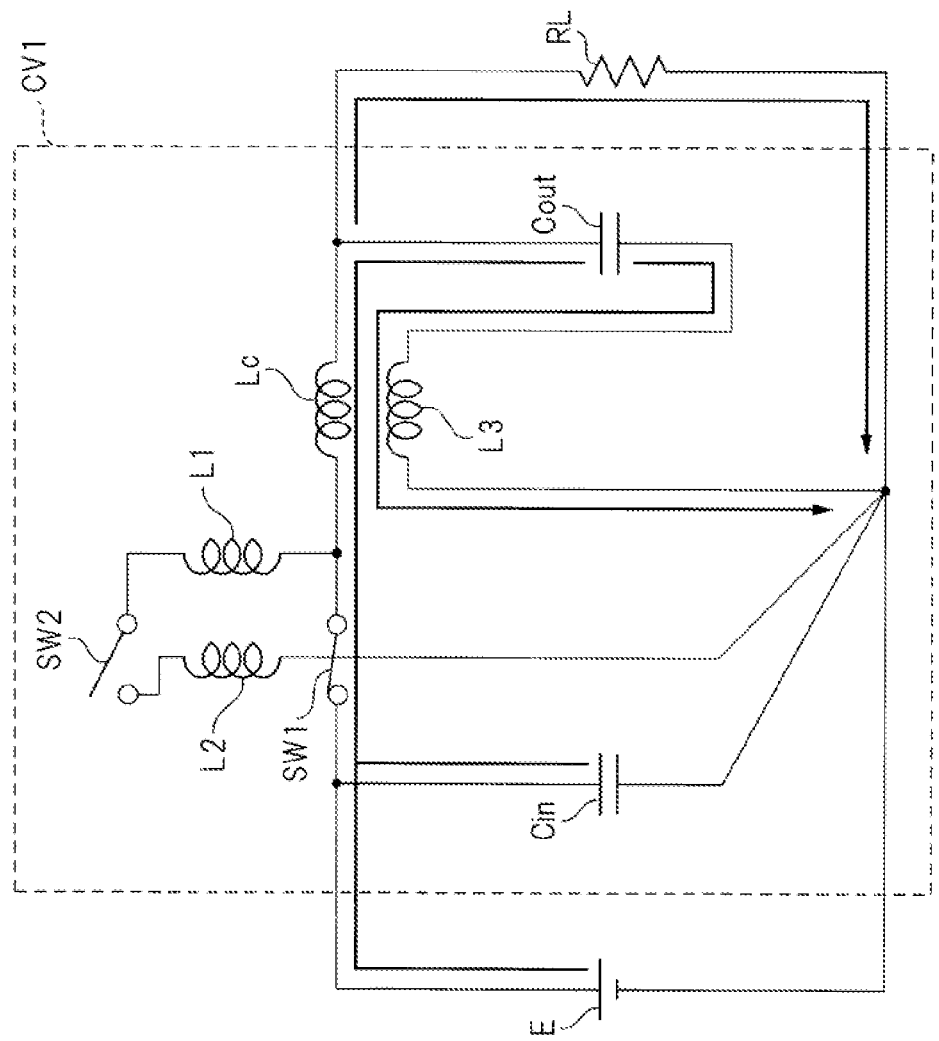
FIG. 6 is a circuit diagram showing an electric current path of the electric current flowing through the step-down type DC-DC converter during an ON/OFF operation (ON period).

FIG. 6 is a circuit diagram showing an electric current path of an electric current flowing through the step-down type DC-DC converter CV1 during the ON/OFF operation (ON period). In FIG. 6, in the ON/OFF operation of turning on the high-side element SW1 and turning off the low-side element SW2, an electric current flows through a path comprised of "power supply potential", "high-side element SW1", "inductor Lc", "outputting capacitor Cout (load RL)", and "ground potential" in order. Here, as shown in FIG. 6, a direction (electric current direction) of an electric current flowing through the inductor Lc and a direction (electric current direction) of an electric current flowing through the parasitic inductance L3, which is close to and lined up with the inductor Lc, are opposite to each other.

Figure 7:
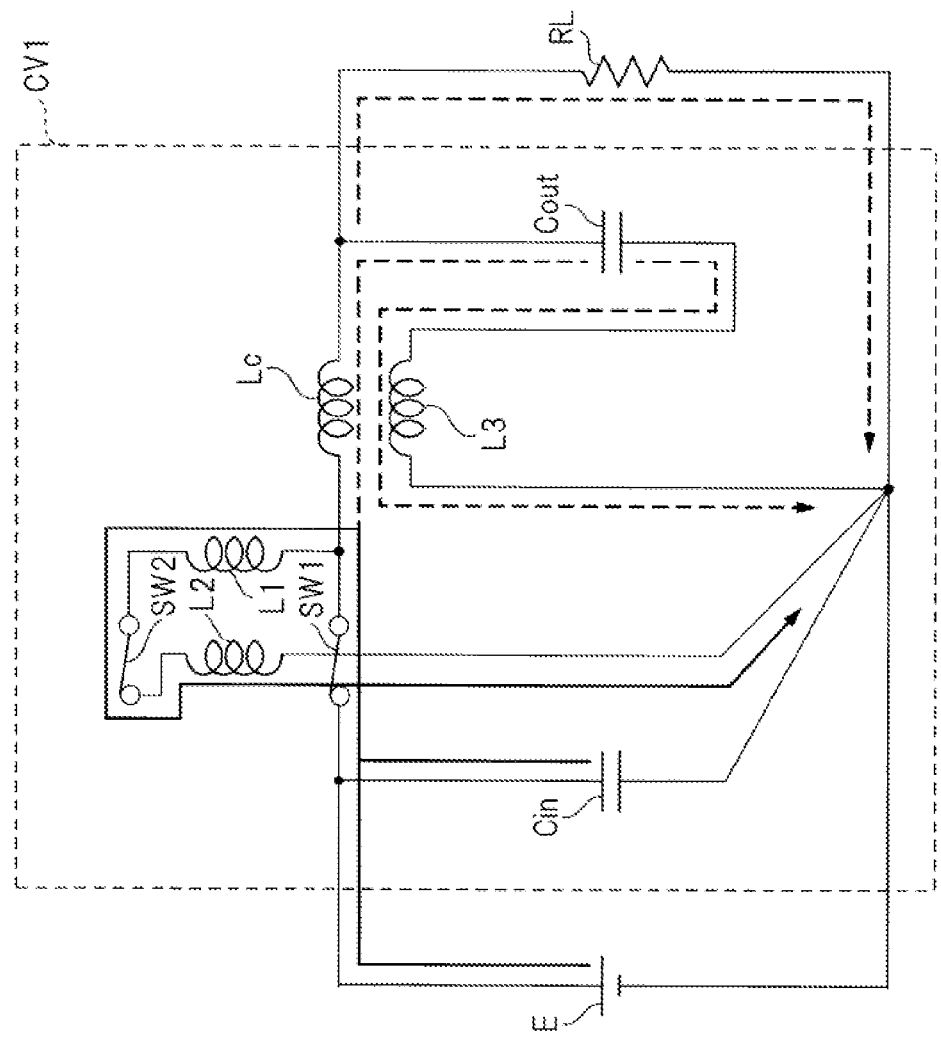
FIG. 7 is a circuit diagram showing an electric current path of the electric current flowing through the step-down type DC-DC converter during the transition period.

Next, FIG. 7 is a circuit diagram showing an electric current path of an electric current flowing through the step-down type DC-DC converter CV1 during the transition period. In FIG. 7, during the transition period in which the high-side element SW1 is turned on and the low-side element SW2 is simultaneously turned on, an electric current flows mainly through a path comprised of "power supply potential", "high-side element SW1", "low-side element SW2", and "ground potential" in order. Here, as shown in FIG. 7, electric currents in opposite directions flow through the parasitic inductance L1 and the parasitic inductance L2, respectively, which are close to and lined up with each other.

Figure 8:
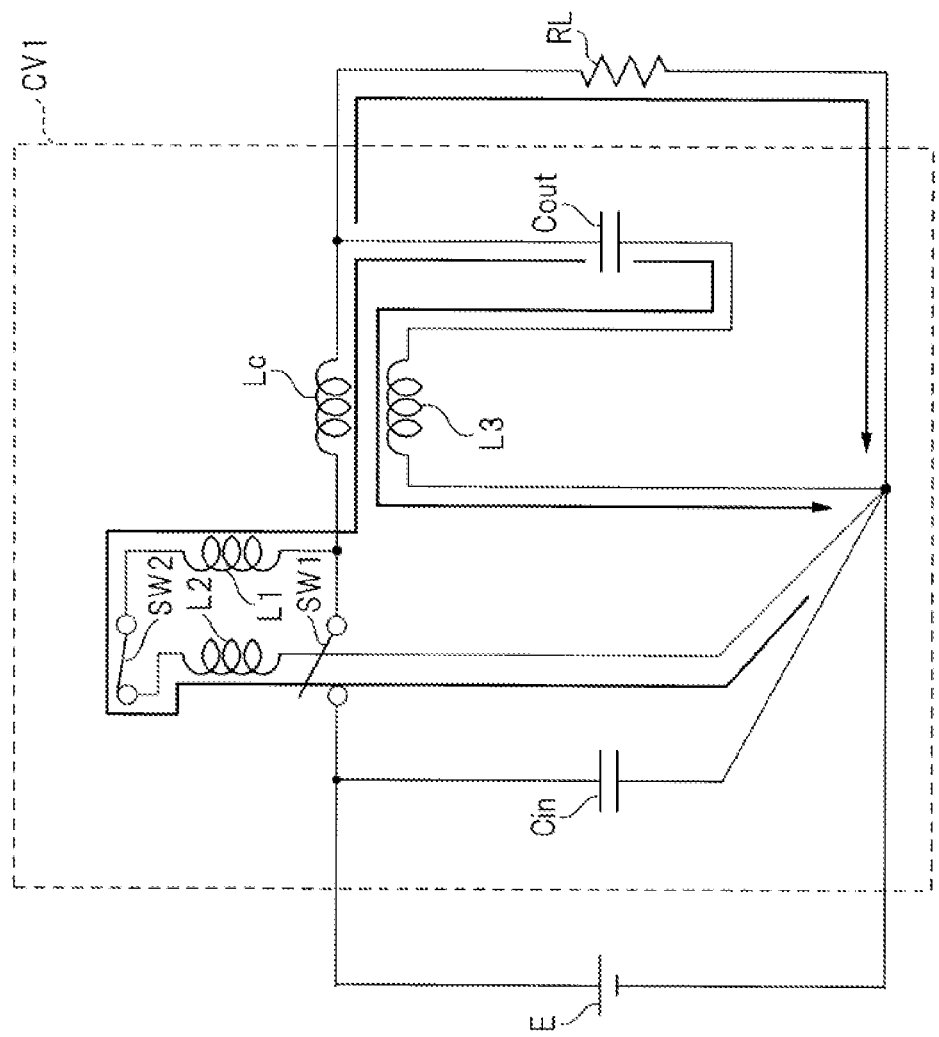
FIG. 8 is a circuit diagram showing an electric current path of the electric current flowing through the step-down type DC-DC converter during an OFF/ON operation (OFF period).

Next, FIG. 8 is a circuit diagram showing an electric current path of an electric current flowing through the step-down type DC-DC converter CV1 during the OFF/ON operation (OFF period). In FIG. 8, when the high-side element SW1 is turned off and the low-side element SW2 is turned on, an electric current flows through a path comprised of "ground potential", "low-side element SW2", "inductor Lc", "output capacitor Cout (load RL)", and "ground potential" in order. Here, as shown in FIG. 8, electric currents in opposite directions flow in the parasitic inductance L1 and the parasitic inductance L2, respectively, which are close to and lined up with each other, and electric currents in opposite directions also flow in the inductor Lc and the parasitic inductance L3, respectively, which are close to and lined up with to each other.

As described above, in the step-down type DC-DC converter CV1 of present embodiment, the ON/OFF operation shown in FIG. 6, the operation of the transition period shown in FIG. 7, and the OFF/ON operation shown in FIG. 8 are repeated, whereby an output voltage whose absolute value is smaller than the input voltage is output from the input voltage (power supply potential) supplied from the power supply E to the load RL.

<Features on Circuit According to Embodiment>

Next, the features (characteristic points) on the circuit of the step-down type DC-DC converter CV1 in the present embodiment will be described. The first feature of the present embodiment is that, for example, as shown in FIG. 5, a first wiring (first wiring portion), coupling the high-side element SW1 and the low-side element SW2 with each other, and a second wiring (second wiring portion), coupling the low-side element SW2 and the ground potential with each other, are arranged close to each other and also lined up with (more preferably, in parallel with) each other. That is, the first feature of the present embodiment is that the arrangement relation of the high-side element SW1 and the low-side element SW2 coupled in series with each other is devised so as to provide the region 200 in where the first wiring and the second wiring are lined up with (more preferably, in parallel with) each other. More specifically, as shown in FIG. 5, a connecting path between the high-side element SW1 and the low-side element SW2 is devised so as to form a closed loop in a plan view. Thus, according to the first feature in the present embodiment, the effective inductance of in the region 200 in where the first wiring and the second wiring are lined up with each other can be reduced. This is because the effective inductance between the first wiring and the second wiring is reduced by arranging the first wiring and the second wiring, in which electric currents flowing in opposite directions to each other, so as to be close to each other and also lined up with each other. As a result, according to the first feature of the present embodiment, it is possible to reduce the high-frequency noise generated due to the parasitic inductance L1 and the parasitic inductance L2 existing in the electric current path of a through current flowing from the power supply potential to the ground potential during the transition period. In other words, according to the first feature in the present embodiment, since it is possible to reduce the effective inductance by combining the parasitic inductance L1 and the parasitic inductance L2 with each other in the region 200, the generation of the high-frequency noise proportional to the inductance can be reduced. In particular, from the viewpoint of reducing the effective inductance, it is desirable to reduce the distance between the first wiring in which an electric current flows in one direction and the second wiring in which an electric current flows in the other direction opposite to the one direction.

As described above, the basic idea underlying the first feature in the present embodiment is to reduce the high-frequency noise by coupling the parasitic inductance L1 and the parasitic inductance L2 with each other so as to reduce the effective inductance. According to this idea, even if the parasitic inductance L1 and the parasitic inductance L2 inevitably exist, the effective inductance can be reduced. That is, the basic idea in the present embodiment is not to reduce each of the parasitic inductance L1 and the parasitic inductance L2, but to couple the parasitic inductance L1 and the parasitic inductance L2 with each other such that the effective inductance becomes small. In this respect, the basic idea in the present embodiment differs from the related art which focuses on reducing the parasitic inductance L1 and the parasitic inductance L2 themselves. In particular, in the related art focusing on reducing the parasitic inductance L1 and the parasitic inductance L2 itself, since the parasitic inductance L1 and the parasitic inductance L2 themselves cannot be eliminated, there is a limit to reducing the parasitic inductance L1 and the parasitic inductance L2 themselves, and it is not possible to suppress the generation of high-frequency noise of a certain amount or more.

On the other hand, according to the basic idea in the present embodiment, even if the parasitic inductance L1 and the parasitic inductance L2 are present, the effective inductance can be reduced by coupling the parasitic inductance L1 and the parasitic inductance L2, such that the effective inductance can be reduced to the minimum value or less of the parasitic inductance L1 and the parasitic inductance L2. As a result, according to the basic idea in the present embodiment, it is also possible to realize reduction of high-frequency noises which is difficult to realize by the related art. Therefore, according to present embodiment, noise countermeasures such as by-pass capacitors and snubber circuits for countermeasures against high-frequency noise are not required. As a result, in the present embodiment, it is possible to suppress an increase in the number of components composing the step-down type DC-DC converter CV1. Therefore, according to present embodiment, it is possible to reduce the size and manufacturing costs of the electronic device while realizing sufficient measures against high-frequency noises.

Next, the second feature of the present embodiment is that, for example, as shown in FIG. 5, the wiring coupling the output capacitor Cout and the ground potential with each other is arranged close to and lined up with (more preferably, in parallel with) the inductor Lc. In other words, the second feature of the present embodiment is that, for example, as shown in FIG. 5, the wiring coupling the output capacitor Cout and the ground potential with each other includes a region 300 which is close to and also lined up with (more preferably, in parallel with) the inductor Lc. As a result, it is possible to suppress the high-frequency noise generated by flowing the load current including a noise such as ringing through the inductor Lc. That is, according to the second feature in the present embodiment, since the wiring coupling the output capacitor Cout and the ground potential is close to and lined up with the inductor Lc, the inductance of the inductor Lc and the parasitic inductance L3 of the wiring coupling the output capacitor Cout and the ground potential with each other are combined with each other, thereby the effective inductance is reduced. In other words, according to the second feature in the present embodiment, the wiring coupling the output capacitor Cout and the ground potential with each other is arranged nearby the inductor Lc and also lined up with the inductor Lc. Also, according to the second feature in the present embodiment, a direction of the electric current flowing through the wiring coupling the output capacitor Cout and the ground potential and a direction of the electric current flowing through the inductor Lc are opposite to each other. As a result, since the effective inductance is reduced by coupling the inductance of the inductor Lc and the parasitic inductance L3 of the wiring to each other, it is possible to suppress both the generation of the high-frequency noise caused by the inductor Lc and the generation of the high-frequency noise caused by the parasitic inductance L3. That is, according to the second feature in the present embodiment, in order to reduce both the high-frequency noise generated due to the inductor Lc and the high-frequency noise generated due to the parasitic inductance L3, the effective inductance is reduced by combining the inductance of the inductor Lc and the parasitic inductance L3 existing in the wiring coupling the output capacitor Cout and the ground potential with each other to each other. As a result, it is possible to suppress the generation of the high-frequency noise caused by the inductance of the inductor Lc and the parasitic inductance L3.

The high-frequency noise generated due to the inductor Lc is represented by the inductance of the inductor Lc times the current change rate. In this regard, since the load current flowing through the inductor Lc does not change with time in the steady state, the current change rate becomes zero. Therefore, since the load current that constantly flows does not affect the generation of the high-frequency noise, the low-voltage DC-DC converter CV1 in the present embodiment can suppress the generation of the high-frequency noise without affecting the electric power conversion efficiency.

As described above, by employing the first feature of the present embodiment, it is possible to reduce the generation of the high-frequency noise caused by each of the parasitic inductance L1 and the parasitic inductance L2. On the other hand, adopting the second feature in the present embodiment, it is possible to reduce the generation of the high-frequency noise due to the inductance and the parasitic inductance L3 of the inductor Lc. Therefore, by employing at least one of the first feature in the present embodiment and the second feature in the present embodiment, it is possible to suppress the generation of the high-frequency noise from the step-down type DC-DC converter CV1. In this regard, from the viewpoint of sufficiently suppressing the generation of the high-frequency noise from the step-down type DC-DC converter CV1, it is desirable to employ both of the first and second features described above. This is because, by employing both the first feature and the second feature in the present embodiment, not only the high-frequency noise caused by the parasitic inductance L1 and the parasitic inductance L2 but also the high-frequency noise caused by the inductance of the inductor Lc and the parasitic inductance L3 can be suppressed.

In the step-down type DC-DC converter CV1 of present embodiment, noise countermeasures such as a bypass capacitor and snubber circuits for countermeasures against high-frequency noise are not required. As a result, in the present embodiment, it is possible to suppress an increase in the number of components composing the step-down type DC-DC converter CV1. Therefore, according to present embodiment, it is possible to obtain remarkable effects that it is possible to reduce the size and manufacturing costs of the electronic device while realizing sufficient measures against high-frequency noises.

<Mounting Configuration of Step-Down Type Dc-Dc Converter According to Embodiment>

Next, the mounting configuration of the step-down type DC-DC converter CV1 in this embodiment will be described.

Figure 9:
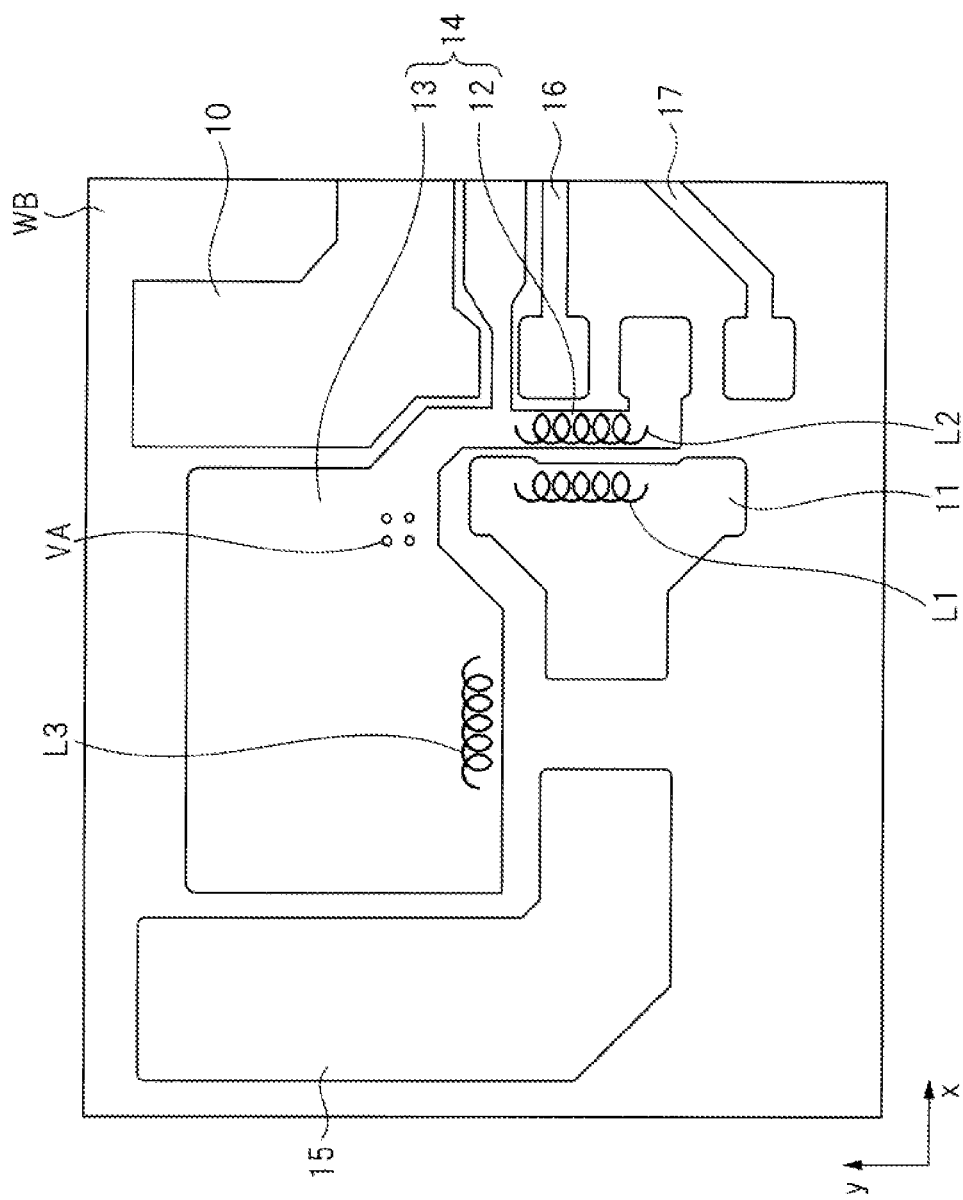
FIG. 9 is a plan view schematically showing the wiring layout of a wiring substrate composing the step-down type DC-DC converter according to the embodiment.

FIG. 9 is a plan view schematically showing a wiring layout of a wiring substrate composing the step-down type DC-DC converter CV1 according to the present embodiment. The wire substrate WB in the present embodiment is composed of, for example, a rigid substrate in which a glass fiber is impregnated with an epoxy resin, a polyimide resin, a maleimide resin, or the like. The wiring substrate WB has, for example, a multi-layer wiring structure, and a plurality of wiring portions are formed on the surface of the wiring substrate WB, for example, as shown in FIG. 9.

In FIG. 9, a power supply wiring portion 10 to which a power supply potential is to be supplied is formed on the surface of the wiring substrate WB in the present embodiment. The first wiring portion 11 is spaced apart from the power supply wiring portion 10. Further, a second wiring portion 14 is formed on the surface of the wiring substrate WB so as to be interposed between the power supply wiring portion 10 and the first wiring portion in plan view. The second wiring portion 14 includes an extension portion 12 passing through between the power supply wiring portion 10 and the first wiring portion 11 and composing a part of a region 200 shown in FIG. 5, and a large area portion 13 connected to the extension portion 12. A ground potential is to be supplied to the second wiring portion 14 configured as described above.

Further, in FIG. 9, the output wiring portion 15 is formed at a position which is spaced apart from the first wiring portion 11 and the second wiring portion 14 in plan view. An output voltage is output from the output wiring portion 15. Further, in FIG. 9, the gate wiring portion 16 is formed in the vicinity of the second wiring portion 14, and the gate wiring portion 17 is formed in the vicinity of the first wiring portion 11.

In the wiring substrate WB configured as described above, as shown in FIG. 9, the parasitic inductance L1 exists on the first wiring portion 11, while the parasitic inductance L2 exists on the extension portion 12 of the second wiring portion 14. The first wiring portion 11 in which the parasitic inductance L1 is present and the extension portion 12 of the second wiring portion 14 in which the parasitic inductance L2 is present are arranged so as to be close to and parallel to each other. As a result, it can be seen that the part 200 is formed in the wire substrate W B shown in FIG. 9. On the other hand, as shown in FIG. 9, the parasitic inductance L3 exists in the large area portion 13 of the second wiring portion 14.

Subsequently, as shown in FIG. 9, the via VA is connected to the vicinity of the connection portion between the large area portion 13 of the second wiring portion 14 and the extension portion 12 of the second wiring portion 14. That is, the wiring substrate WB in the present embodiment has a first wiring layer in which the first wiring portion 11, the second wiring portion 14, the power supply wiring portion 10, and the output wiring portion 15 are formed, and has a multilayered wiring configuration including a second wiring layer differing from the first wiring layer. In the second wiring layer different from the first wiring layer, another wiring portion is formed, and, for example, as shown in FIG. 9, the second wiring portion 14 and the other wiring portion are connected by a via VA in the vicinity of the connection region between the extension portion 12 and the large area portion 13.

As described above, a plurality of wiring portions (wiring patterns) for realizing the step-down type DC-DC converter CV1 are formed in the wiring substrate WB in the present embodiment.

Figure 10:
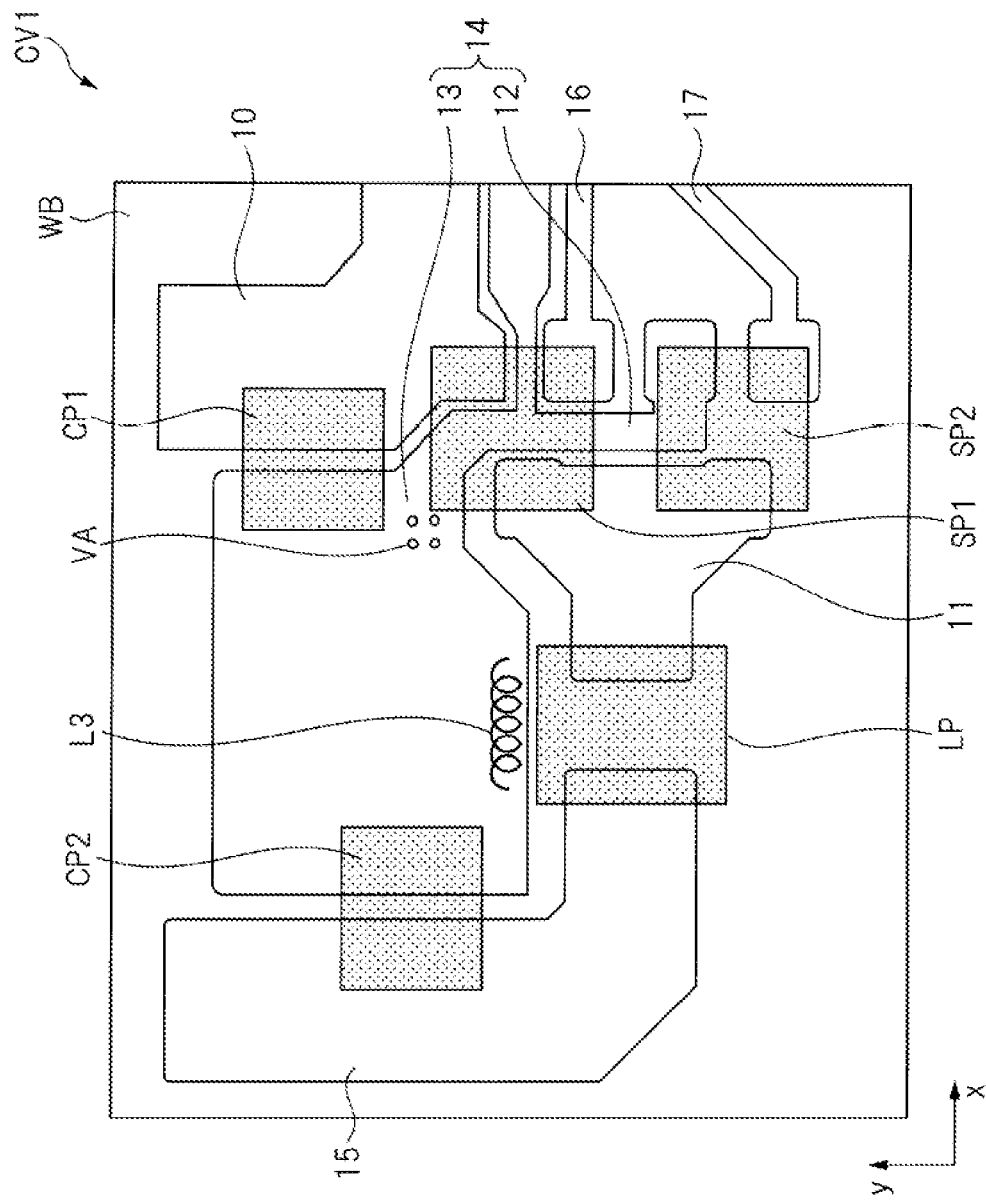
FIG. 10 is a plan view schematically showing a state in which components composing the step-down type DC-DC converter are mounted on the wiring substrate.

Next, FIG. 10 is a plan view schematically showing a state in which the components composing the step-down type DC-DC converter CV1 are mounted on the wire substrate WB. In FIG. 10, the semiconductor component SP1 is arranged on the wiring substrate WB so as to straddle the extension portion 12 of the second wiring portion 14, and arranged on the wiring substrate WB so as to connect the power supply wiring portion 10 with the first wiring portion 11. Specifically, for example, a field-effect transistor (power transistor) composing the high-side element (SW1) shown in FIG. 5 is formed in the semiconductor component SP1.

At this time, the drain of the high-side element is connected to the power supply wiring portion 10, the source of the high-side element is connected to the first wiring portion 11, and the gate of the high-side element is connected to the gate wiring portion 16.

Subsequently, the semiconductor component SP2 is arranged on the wiring substrate WB so as to connect the first wiring portion 11 with the second wiring portion 14. More specifically, a field-effect transistor (power transistor) composing, for example, the low-side element (SW2) shown in FIG. 5 is also formed in the semiconductor component SP2. Here, the drain of the low-side element is connected to the first wiring portion 11, the source of the low-side element is connected to the extension portion 12 of the second wiring portion 14, and the gate of the low-side element is connected to the gate wiring portion 17.

Further, as shown in FIG. 10, the capacitive component CP1 is arranged on the wiring substrate WB so as to connect the power supply wiring portion 10 with the large area portion 13 of the second wiring portion 14. In the capacitive component CP1, for example, a chip capacitor composing the input capacitor Cin shown in FIG. 5 is formed. The capacitive component CP2 is arranged on the wiring substrate WB so as to connect the outputting wiring portion 15 with the large area portion 13 of the second wiring portion 14. The capacitive component CP2 is formed with, for example, a chip capacitor composing an output capacitor (Cout) shown in FIG. 5.

As shown in FIG. 10, the inductor component LP is arranged on the wiring substrate WB so as to connect the first wiring portion 11 with the output wiring portion 15. An inductor Lc shown in FIG. 5, for example, is formed in the inductor component LP, and is composed of one of a winding type inductor component and a chip inductor. At this time, as shown in FIG. 10, the large area portion 13 of the second wiring portion 14 includes a portion (region) parallel to the inductor component LP.

In this manner, a mounting layout for realizing the step-down type DC-DC converter CV1 in the present embodiment is constructed. That is, according to the mounting layout shown in FIG. 10, a circuit configuration (see FIG. 5) having the first feature (the region 200 in FIG. 5) and the second feature (the region 300 in FIG. 5) in the present embodiment is realized.

Next, referring to the mounting layout of the step-down type DC-DC converter CV1 shown in FIG. 10, an electric current path of an electric current flowing through the step-down type DC-DC converter CV1 will be described.

Figure 11:
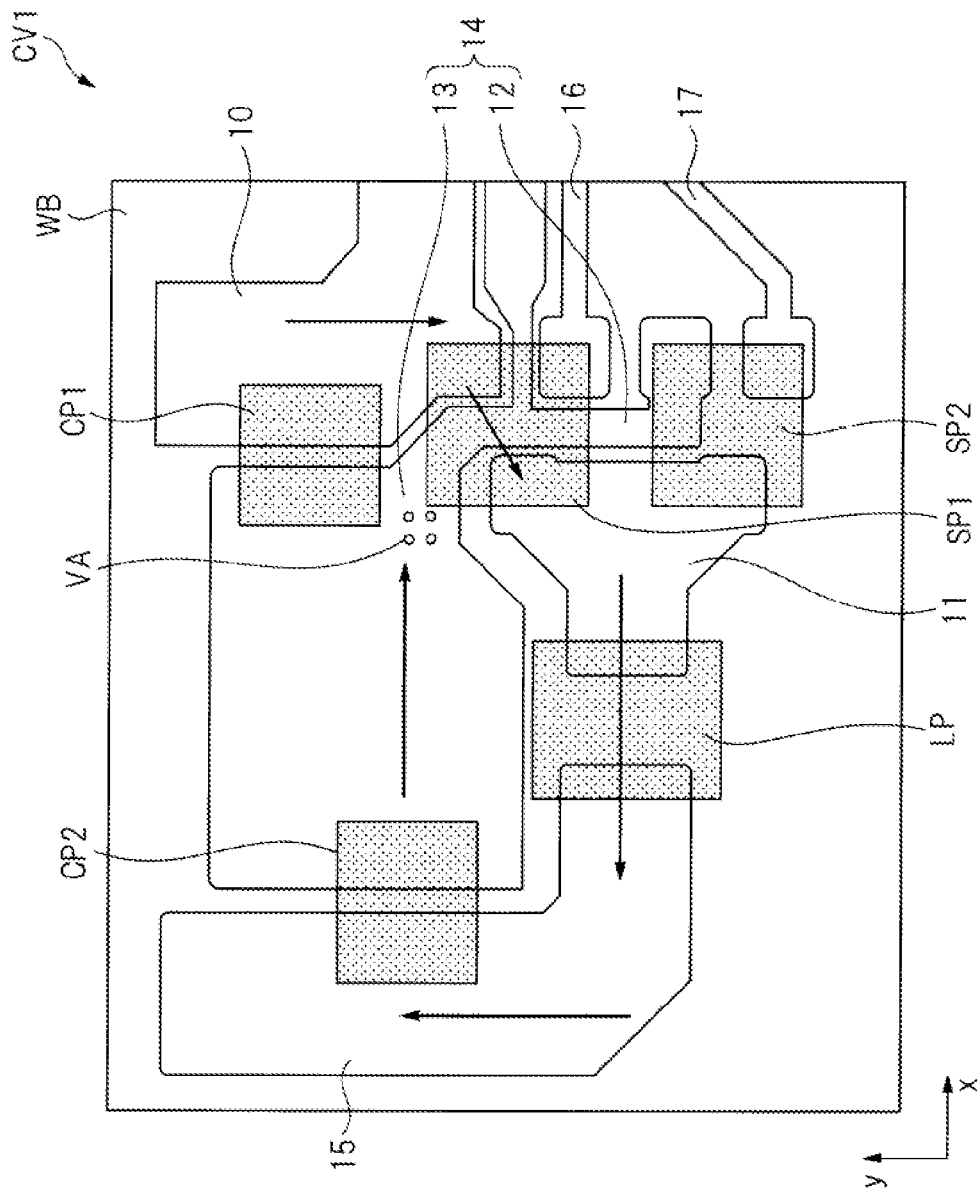
FIG. 11 is a mounting layout diagram showing an electric current path of the electric current flowing through the step-down type DC-DC converter during the ON/OFF operation (ON period).

FIG. 11 is a mounting layout diagram showing an electric current path of an electric current flowing through the step-down type DC-DC converter CV1 during the ON/OFF operation (ON period). In FIG. 11, in the ON/OFF operation of turning on the high-side element SW1 and turning off the low-side element SW2, an electric current flows through a path comprised of "power supply wiring portion 10 (power supply potential)", "semiconductor component SP1", "inductor component LP", "output wiring portion 15", "capacitive component CP2", and "large area portion 13 (ground potential) of second wiring portion 14" in order.

Figure 12:
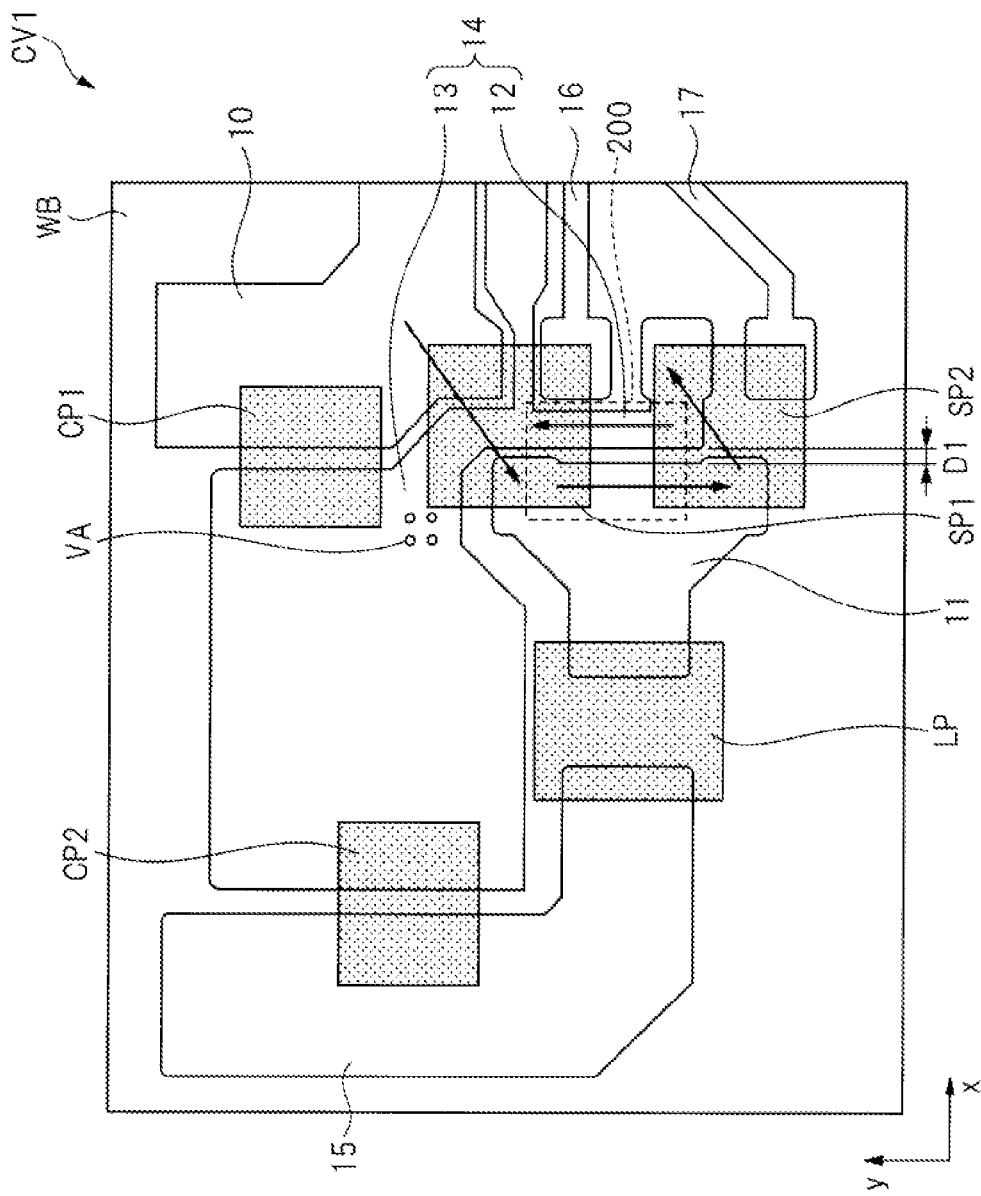
FIG. 12 is a mounting layout diagram showing an electric current path of the electric current flowing through the step-down type DC-DC converter in the transition period.

Next, FIG. 12 is a mounting layout diagram showing an electric current path of an electric current flowing through the step-down type DC-DC converter CV1 during the transition period. In FIG. 12, during the transition period in which the high-side element SW1 is turned on and the low-side element SW2 is simultaneously turned on, an electric current flows mainly through a path comprised of "power supply wiring portion 10 (power supply potential)", "semiconductor component SP1", "first wiring portion 11", "semiconductor component SP2", and "extension portion 12 (ground potential) of second wiring portion 14" in order.

Figure 13:
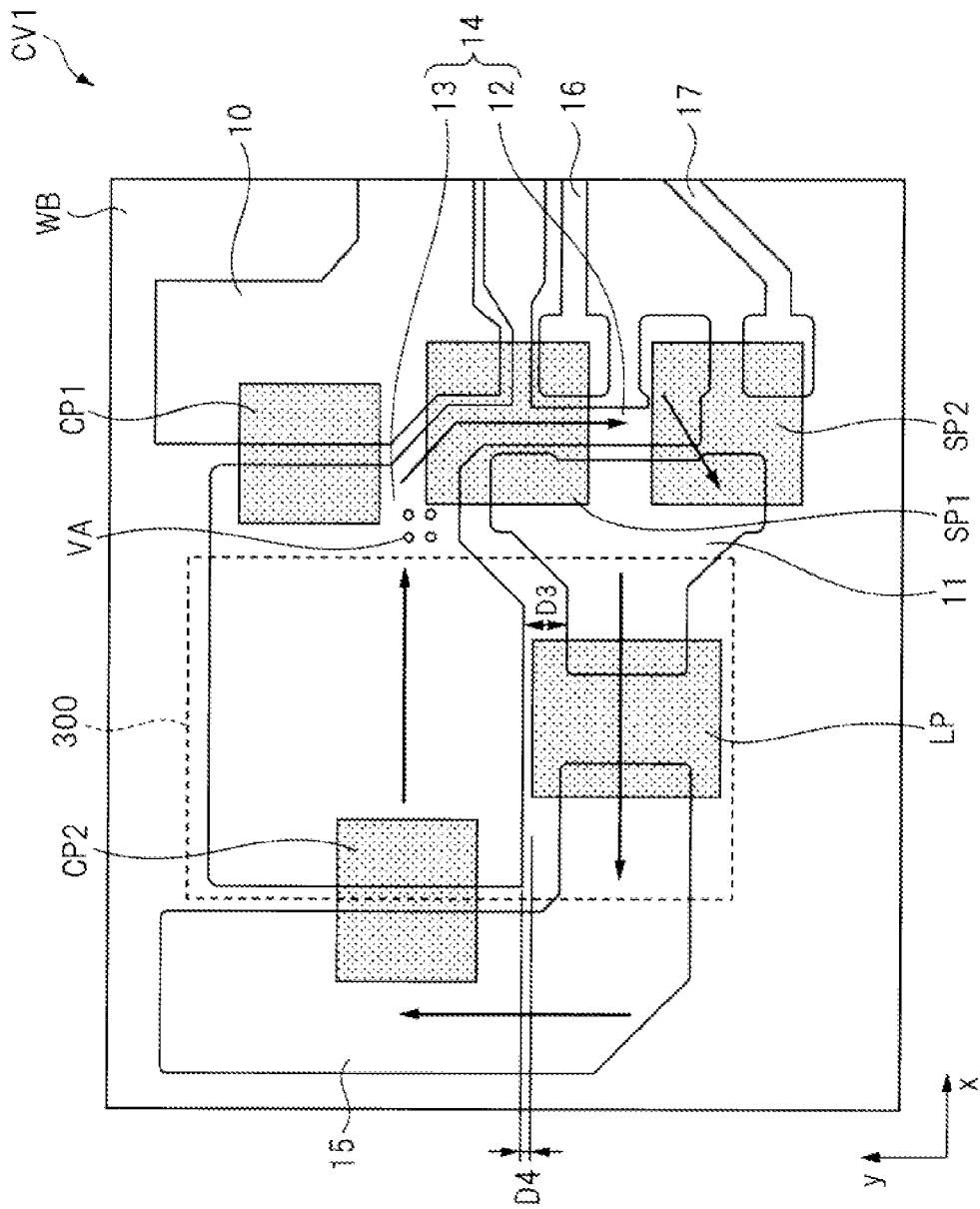
FIG. 13 is a mounting layout diagram showing an electric current path of the electric current flowing through the step-down type DC-DC converter during OFF/ON operation (OFF period).

Next, FIG. 13 is a mounting layout diagram showing an electric current path of an electric current flowing through the step-down type DC-DC converter CV1 during the OFF/ON operation (OFF period). In FIG. 13, when the high-side element SW1 is turned off and the low-side element SW2 is turned on in the OFF/ON operation, an electric current flows through a path comprised of "large area portion 13 (ground potential) of second wiring portion 14", "extension portion 12 of second wiring portion 14", "semiconductor component SP2", "first wiring portion 11", "inductor component LP", "output wiring portion 15", "capacitive component CP2", and "large area portion 13 (ground potential) of second wiring portion 14" in order.

As described above, in the step-down type DC-DC converter CV1 in the present embodiment, by repeating the ON/OFF operation shown in FIG. 11, the operation of the transition period shown in FIG. 12, and the OFF/ON operation shown in FIG. 13, an output voltage whose absolute value is smaller than the input voltage is output from the output wiring unit 15 from the input voltage (power supply potential) input to the power supply wiring unit 10.

Here, for example, FIG. 12 schematically shows a region 200. However, the region 200 shown in FIG. 12 is a main region of the region 200, and the region 200 is not limited to the shape of the main region. The region 200 shown in FIG. 12 is configured to include a first wiring portion 11 and a second wiring portion 12 extending in parallel to each other in the y direction. At this time, the region 200 is defined as a portion including the following regions in order to enhance the effect of reducing the effective inductance due to the combination of the parasitic inductance of the first wiring portion 11 and the parasitic inductance of the extension portion 12 of the second wiring portion 14. That is, the region 200 shown in FIG. 12 is defined as a portion including a region in which at least the direction of the electric current flowing through the first wiring portion 11 and the direction of the electric current flowing through the extension portion 12 of the second wiring portion 14 are opposite to each other, and in FIG. 12, the maximum distance D1 between the first wiring portion 11 and the extension portion 12 of the second wiring portion 14 is smaller than the distance (referred to as D2) between the first wiring layer (the wiring layer shown in FIG. 12) in which the first wiring portion 11 and the second wiring portion 14 are respectively formed and the second wiring layer (the lower surface side of the wiring substrate WB) positioned one lower than the first wiring layer (not shown in FIG. 12). This is because, when the maximum distance D1 between the first wiring portion 11 and the extension portion 12 of the second wiring portion 14 in the region 200 is larger than the distance D2 between the first wiring layer and the second wiring layer in the thickness direction of the wiring substrate WB, the effect of reducing the effective inductance due to the coupling between the parasitic inductance existing in the first wiring portion 11 and the parasitic inductance existing in the extension portion 12 of the second wiring portion 14 is weakened.

Since the distance D2 between the first wiring layer and the second wiring layer in the thickness direction of the wiring substrate WB is, for example, 0.15 mm, it is desirable that the maximum distance D1 between the first wiring portion 11 and the extension portion 12 of the second wiring portion 14 in the region 200 is smaller than 0.15 mm. More specifically, the maximum distance D1 between the first wiring portion 11 and the extension portion 12 of the second wiring portion 14 in the region 200 is desirably 0.1 mm or less. However, when the distance (D2) between the first wiring layer and the second wiring layer in the thickness direction of the wiring substrate WB is smaller than 0.1 mm, for example, such as 0.065 mm, by devising not to arrange the wiring patterns overlapping with the region 200 in a planar manner in the second wiring layer located one layer below the first wiring layer, it is possible to maintain the relationship in which the maximum distance D1 between the first wiring portion 11 and the extension portion 12 of the second wiring portion 14 in the region 200 is larger than the distance (D2) between the first wiring layer and the second wiring layer in the thickness direction of the wiring substrate WB. In this case, the effective inductance can be reduced by the combination of the parasitic inductance existing in the first wiring portion 11 and the parasitic inductance existing in the extension portion 12 of the second wiring portion 14.

Next, for example, FIG. 13 schematically shows a region 300. However, the part 300 shown in FIG. 13 is a main region of the part 300, and the part 300 is not limited to the shape of the main region. The region 300 shown in FIG. 13 is configured to include an inductor component LP and a second wiring portion 12 extending in parallel to each other in the x direction. At this time, the region 300 is defined as a portion including the following region in order to enhance the effect of reducing the effective inductance due to the coupling between the parasitic inductance of the inductor component LP and the parasitic inductance of the large area portion 13 of the second wiring portion 14. That is, the region 300 shown in FIG. 13 is defined as a portion including a region in which at least the direction of the electric current flowing through the inductor component LP and the direction of the electric current flowing through the large area portion 13 of the second wiring portion 14 are opposite to each other, and the maximum distance D3 between the first wiring portion 11 and the large area portion 13 of the second wiring portion 14 is smaller than the distance (referred to as D2) between the first wiring layer (the wiring layer shown in FIG. 13) in which the first wiring portion 11 and the second wiring portion 12 are respectively formed and the second wiring layer (the lower surface side of the wiring substrate WB) located one lower than the first wiring layer (not shown in FIG. 12). As a result, the distance D4 between the inductor component LP and the large area portion 12 of the second wiring portion 14 is inevitably smaller than the maximum distance D3 between the first wiring portion 11 and the large area portion 13 of the second wiring portion 14. As a result, in the region 300, the inductor component LP and the large area portion 13 of the second wiring portion 14 are arranged close to each other, whereby the effect of reducing the effective inductance due to the coupling between the parasitic inductance existing in the large area portion 13 of the second wiring portion 14 and the parasitic inductance existing in the inductor component LP can be exhibited.

Since the distance D2 between the first wiring layer and the second wiring layer in the thickness direction of the wiring substrate WB is, for example, 0.15 mm, it is desirable that the largest distance D3 between the first wiring portion 11 and the large area portion 13 of the second wiring portion 12 in the region 300 is smaller than 0.15 mm. More specifically, the maximum distance D3 between the first wiring portion 11 and the large area portion 13 of the second wiring portion 12 in the region 300 is desirably 0.1 mm or less. However, when the interval (D2) between the first wiring layer and the second wiring layer in the thickness direction of the wiring substrate WB is smaller than 0.1 mm, for example, such as 0.065 mm, by devising not to arrange the wiring patterns overlapping with the region 300 in a planar manner in the second wiring layer located at the lower layer of the first wiring layer, it is possible to maintain the relationship in which the largest interval D3 between the first wiring portion 11 and the large area portion 13 of the second wiring portion 14 in the region 300 is larger than the interval (D2) between the first wiring layer and the second wiring layer in the thickness direction of the wiring substrate WB. In this case, the effective inductance can be reduced by the coupling between the parasitic inductance existing in the inductor component LP and the parasitic inductance existing in the large area portion 13 of the second wiring portion 14.

<Features on Mounting According to Embodiment>

Next, the features (characteristic points) on the mounting of the step-down type DC-DC converter CV1 in the present embodiment will be described. The third feature of the present embodiment is that, for example, in FIG. 10, the configuration of the inductor component LP is devised such that a direction of an electric current flowing through the inductor component LP and a direction of the electric current flowing through the large area portion 13 of the second wire portion 14 are opposite to each other. More specifically, the inductor component LP can be composed of one of a winding-type inductor component and a chip inductor. For example, when the inductor component LP is composed of a winding-type inductor component, the winding direction of the winding is set such that the direction of the electric current flowing through the inductor component LP and the direction of the electric current flowing through the large area portion 13 of the second wiring portion 14 are opposite to each other. As a result, a configuration is realized in which the direction of the electric current flowing through the parasitic inductance L3 existing in the large area portion 13 of the second wiring portion 14 and the direction of the electric current flowing through the inductor component LP are opposite to each other, and the portion where the parasitic inductance L3 exists and the inductor component LP are arranged close to each other and also lined up with each other. As a result, since the effective inductance is reduced by combining the parasitic inductance L3 and the inductance of the inductor component LP with each other, both of the high-frequency noise caused by the inductor component LP and the high-frequency noise caused by the parasitic inductance L3 can be reduced.

Next, as shown in FIG. 10, for example, the fourth feature of the present embodiment is that the arrangement position of the via VA connecting the second wiring portion 14 to which the ground potential is to be supplied and the ground wiring formed in the second wiring layer differing from the first wiring layer in which the second wiring portion 14 is formed is provided in the vicinity of the connecting area between the extension portion 12 of the second wiring portion 14 and the large area portion 13. In other words, the fourth feature in the present embodiment is that the arrangement position of the vias VA is set to be close to the semiconductor component SP1 in FIG. 10. As a result, for example, as shown in FIG. 11 and FIG. 13, an electric current can be flown through a path comprised of "capacitive component CP2", "large area portion 13 of second wiring portion 14", ("portion where parasitic inductance L3 exists") and "vias VA" in order. That is, by arranging the vias VA so as to realize the fourth feature in the present embodiment, the direction of the electric current flowing through the large area portion 13 of the second wiring portion 14 can be induced to flow in a direction opposite to the direction of the electric current flowing through the inductor component LP. As a result, the second feature in the present embodiment described above is realized. That is, when the fourth feature in the present embodiment is adopted, the inductance of the inductor component LP and the parasitic inductance L3 of the second wiring portion 14 are coupled to each other to induce an effect of decreasing the effective inductance. Therefore, according to the fourth feature of the present embodiment, it is possible to suppress both the incidence of the high-frequency noise caused by the inductor component LP and the generation of the high-frequency noise caused by the parasitic inductance L3.

Effects According to Embodiment

Next, effects in the present embodiment will be described.

Figure 14:
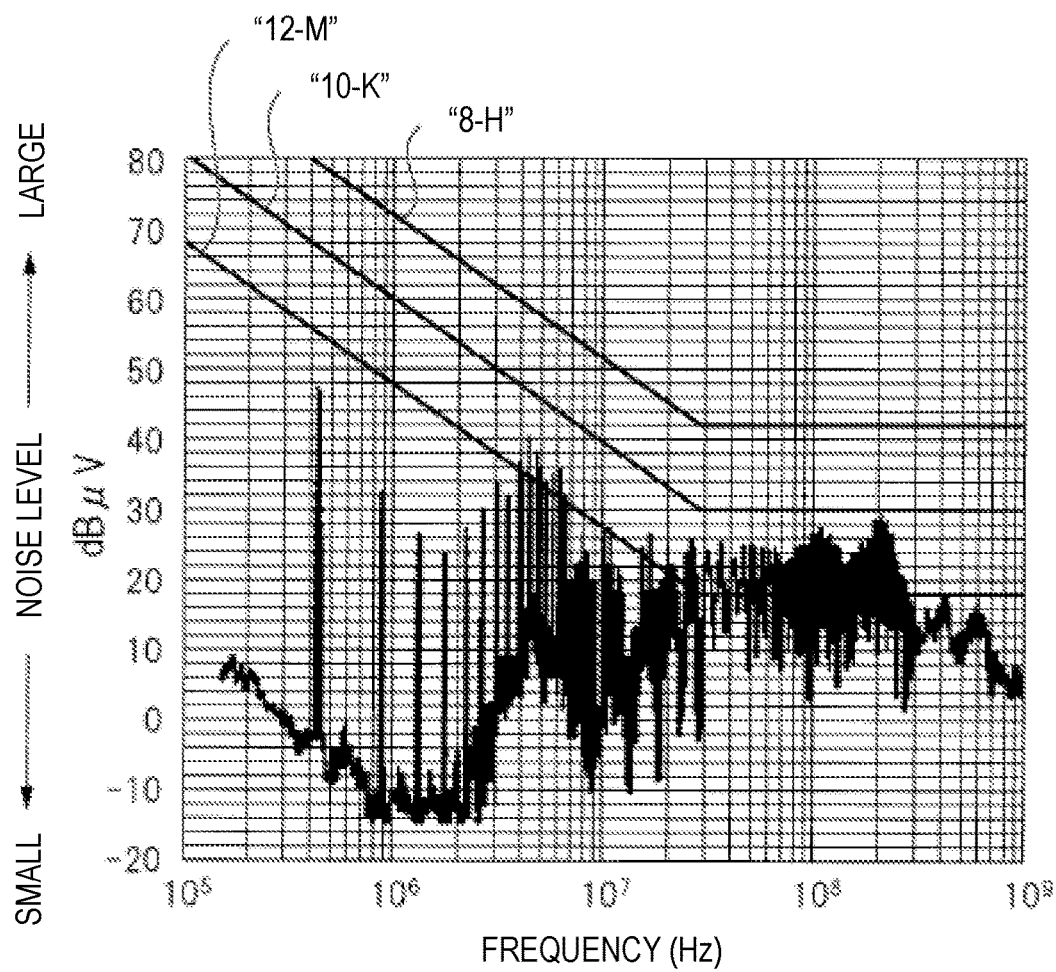
FIG. 14 is a graph showing a conduction EMI characteristic according to the related art.

FIG. 14 is a graph showing a conduction EMI (Electromagnetic Interference) characteristic according to the related art. In FIG. 14, the horizontal axis represents frequency (Hz), and the vertical axis represents noise level (dBμV). In FIG. 14, "12-M", "10-K", and "8-H" indicate standards based on the International Standard IEC61967-4, for example, "8-H" is the looser standard, and "12-M" is the strictest standard. As shown in FIG. 14, in the related art, the standard of "12-M" is not satisfied, and it can be understood that the EMI performance is not sufficiently good. In particular, in the related art, although nine bypass capacitors (anti-noise capacitors) for removing high-frequency noise are mounted in addition to the two capacitors (power supply stabilizing capacitors) which are minimum required for the operation of the step-down type DC-DC converter CV, it is understood that sufficient EMI performance cannot be realized.

Figure 15:
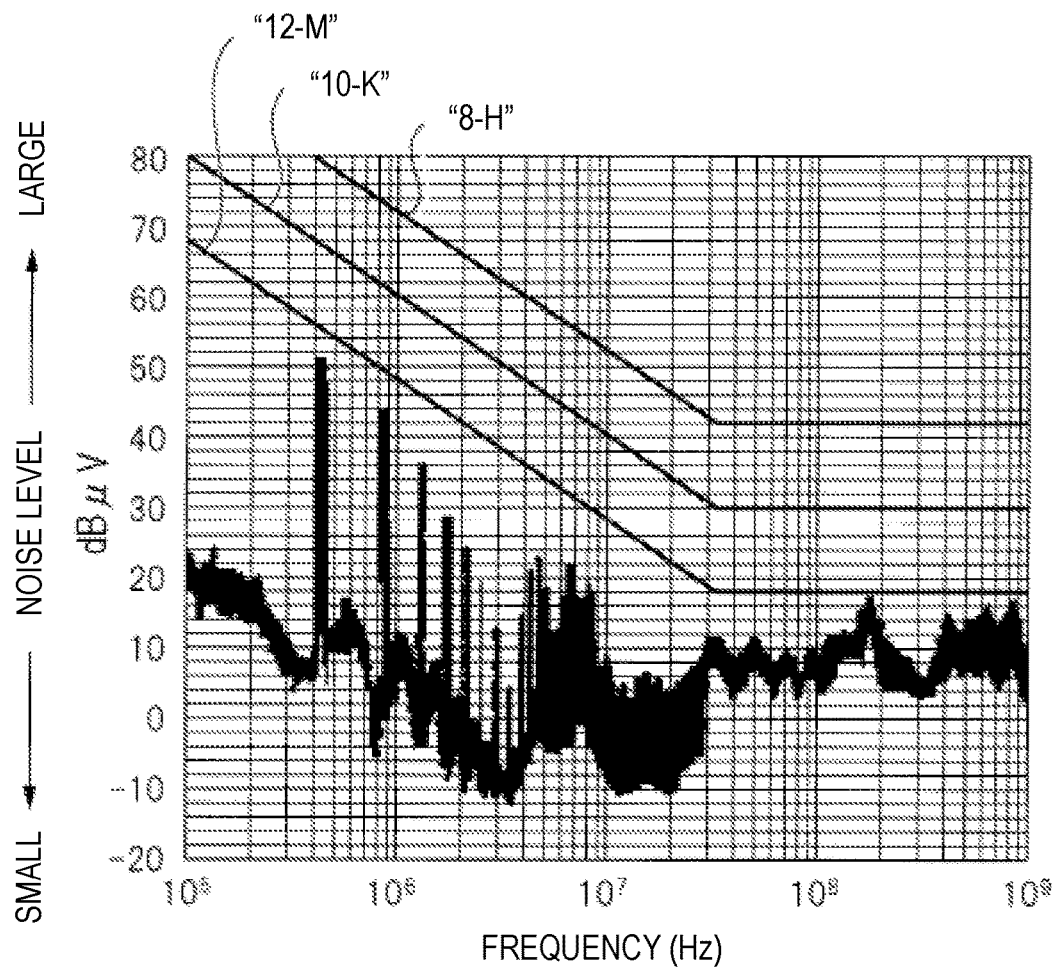
FIG. 15 is a graph showing a conduction EMI characteristic according to the embodiment.

On the other hand, FIG. 15 is a graph showing a conduction EMI characteristic according to the embodiment. In FIG. 15, the horizontal axis represents frequency (Hz), and the vertical axis represents noise level (dBμV). In FIG. 15, "12-M", "10-K", and "8-H" indicate standards based on the International Standard IEC61967-4, for example, "8-H" is the looser standard, and "12-M" is the strictest standard. As shown in FIG. 15, the step-down type DC-DC converter CV1 in the present embodiment satisfy the most stringent "12-M" criterion, and it is understood that the EMI performance is sufficiently good. In particular, it can be seen that in the present embodiment, a sufficient EMI performance can be realized even though a bypass capacitor (a noise countermeasure capacitor) for removing high-frequency noise is not mounted in addition to the two capacitors (power supply stabilizing capacitors) which are minimum required for the operation of the step-down type DC-DC converter CV1.

As described above, the step-down type DC-DC converter CV1 in the present embodiment can reduce nine capacitive components as compared with the step-down type DC-DC converter CV in the related art, and as a result, it is possible to realize sufficiently good EMI characteristics while reducing the component area by 59%. Therefore, it can be seen that the technical idea in the present embodiment is excellent in that the electronic device can be miniaturized and manufacturing costs can be reduced while sufficient measures against high-frequency noises are realized.

Figure 16:
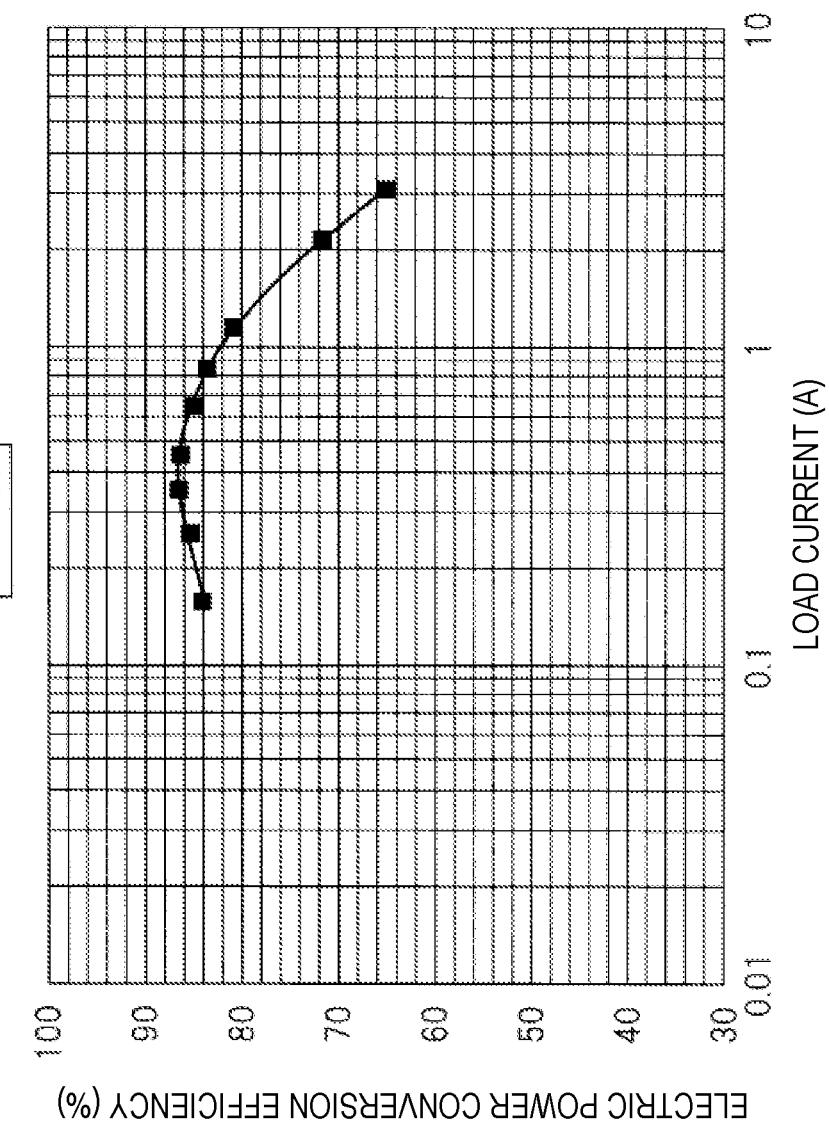
FIG. 16 is a graph showing the relationship between the load current and the electric power conversion efficiency in the step-down type DC-DC converter according to the related art.

Next, FIG. 16 is a graph showing the relationship between the load current and the electric power conversion efficiency in the step-down type DC-DC converter CV according to the related art. In FIG. 16, the horizontal axis represents the load current (A), and the vertical axis represents the electric power conversion efficiency (%). As shown in FIG. 16, the maximum electric power conversion efficiency of the step-down type DC-DC converter CV in the related art is 86.5%.

Figure 17:
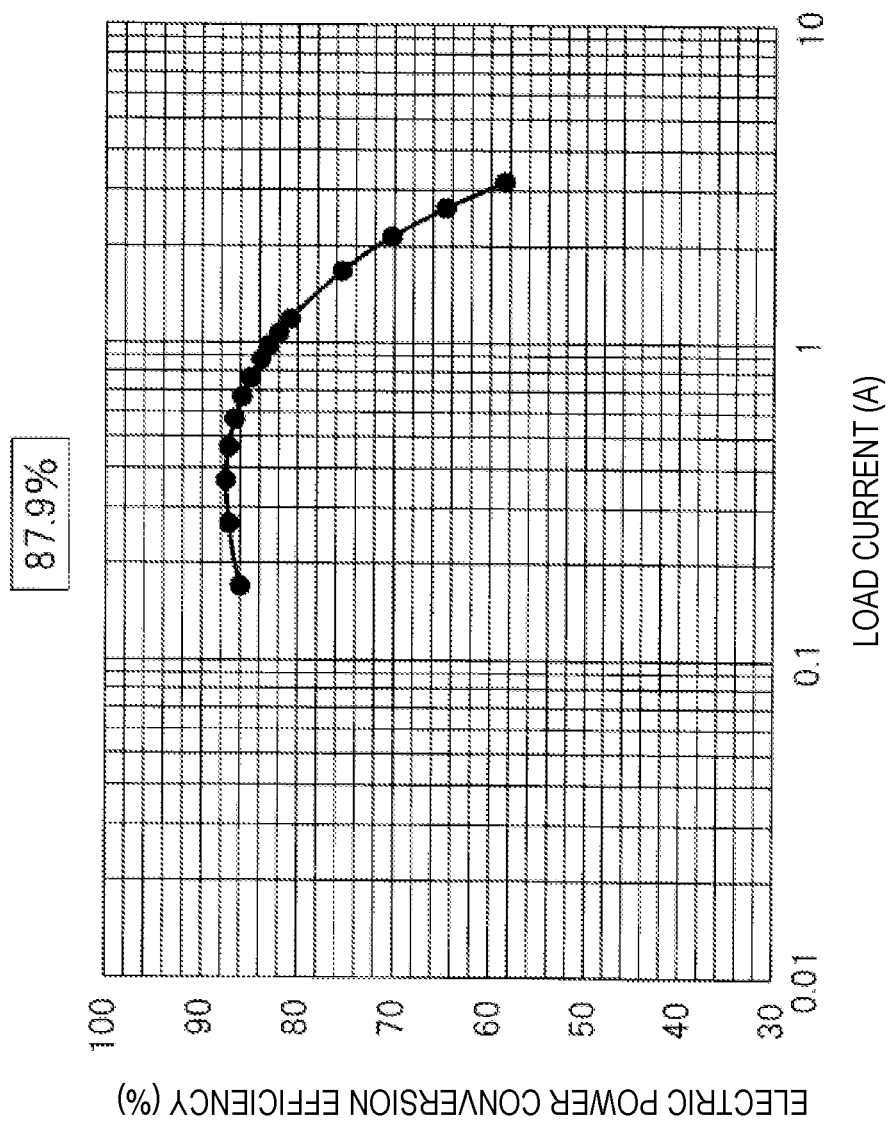
FIG. 17 is a graph showing the relationship between the load current and the electric power conversion efficiency of the step-down type DC-DC converter according to the embodiment.

On the other hand, FIG. 17 is a graph showing the relationship between the load current and the electric power conversion efficiency in the step-down type DC-DC converter CV1 according to the present embodiment. In FIG. 17, the horizontal axis represents the load current (A), and the vertical axis represents the electric power conversion efficiency (%). As shown in FIG. 17, the maximum electric power conversion efficiency of the step-down type DC-DC converter CV1 in the present embodiment is found to be 87.9% of the maximum electric power conversion efficiency. Therefore, comparing FIG. 16 with FIG. 17, it can be seen that the step-down type DC-DC converter CV1 in the present embodiment has a higher maximal electric power conversion efficiency than the step-down type DC-DC converter CV1 in the related art. This means that when the technical idea in the present embodiment is adopted, it is possible to realize sufficient high-frequency noise countermeasures and further to improve the maximum electric power conversion efficiency. Therefore, it can be seen that the technical idea in the present embodiment is a very excellent technical idea in that it cannot only reduce the size and manufacturing costs of the electronic device, but also improve the maximum electric power conversion efficiency, while realizing sufficient measures against high-frequency noises.

Modified Example

Next, a modification will be described.

Figure 18:
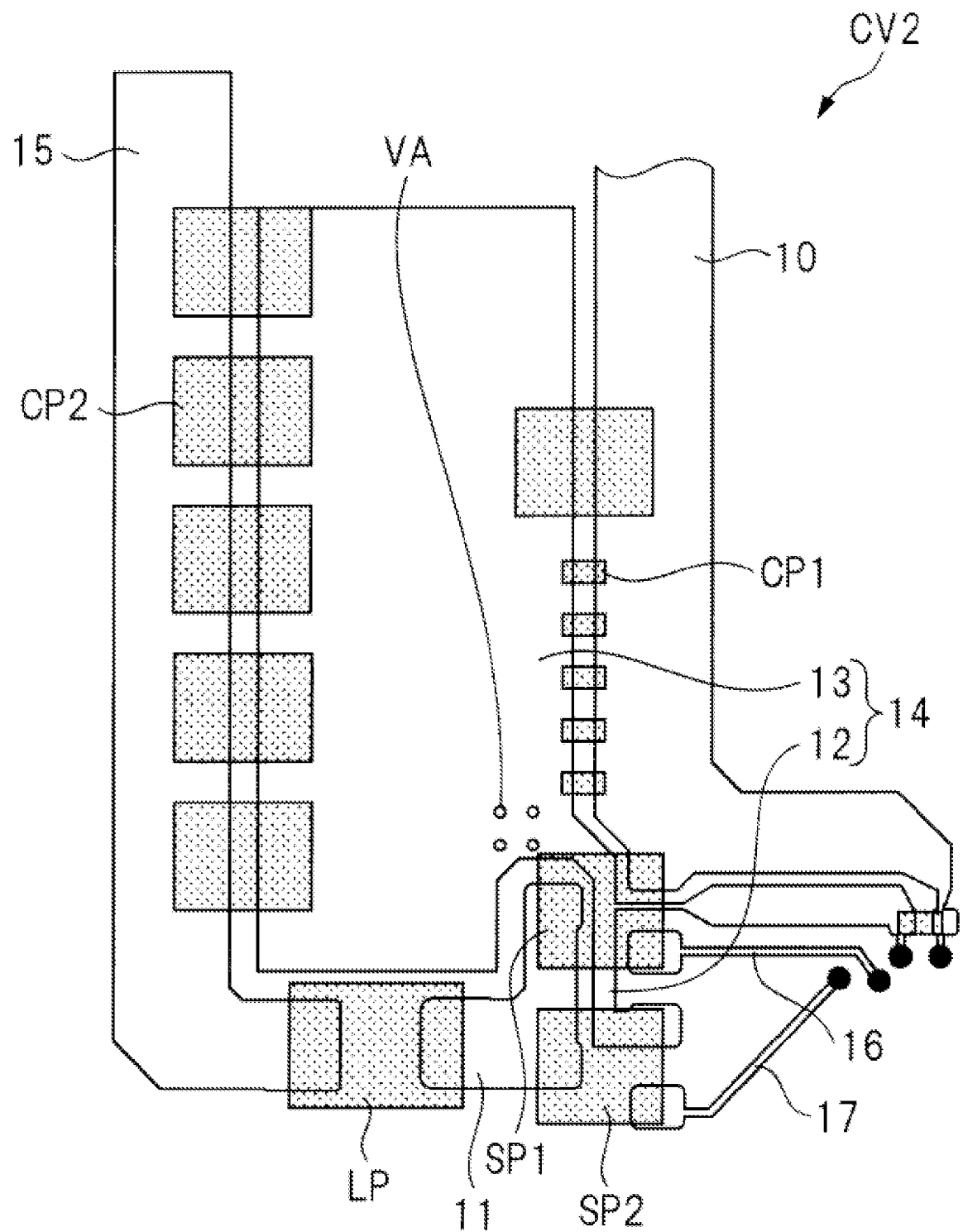
FIG. 18 is a plan view showing a mounting layout of the step-down type DC-DC converter according to a modified example.

FIG. 18 is a plan view showing a mounting layout of the step-down type DC-DC converter CV2 according to the present modified example. In FIG. 18, in the step-down type DC-DC converter CV2 of the present modified example, an input capacitor is formed using a plurality of capacitive components CP1, and an output capacitor is formed using a plurality of capacitive components CP2.

Thus, according to the step-down type DC-DC converter CV2 of the present modified example, the following advantages can be obtained. That is, the step-down type DC-DC converter CV2 are configured to output an output voltage smaller than the input voltage from the input voltage. The magnitude of the output voltage output from the step-down type DC-DC converter CV2 depends on the switching frequency. That is, in the step-down type DC-DC converter CV2, by setting the switching frequency to a predetermined frequency, a desired output voltage can be obtained. Here, the capacitance value of the input capacitor and the capacitance value of the output capacitor change depending on the switching frequency. Therefore, when the input capacitor and the output capacitor are composed of a plurality of capacitive components, the number of the plurality of capacitive components can be adjusted to adjust the capacitance value of the input capacitor and the capacitance value of the output capacitor so that a desired output voltage can be obtained. Further, in the case where the input capacitor and the output capacitor are composed of a plurality of capacitive components, even if a defect occurs in a part of the capacitive components among the plurality of capacitive components, an output voltage close to a desired output voltage can be ensured although the capacitance value changes due to the presence of other capacitive components. As described above, according to the step-down type DC-DC converter CV2 of the present modified example, the reliability of the step-down type DC-DC converter CV2 can be improved.

The invention made by the present inventor has been described above in detail based on the embodiment, but the present invention is not limited to the embodiment described above, and it is needless to say that various modifications can be made without departing from the gist thereof.

What is claimed is:

1. An electronic device comprising:
   a switching regulator comprised of a high-side element and a low-side element that are coupled in series between a first potential and a second potential lower than the first potential,
   wherein the switching regulator includes:
      a first wiring portion coupling the high-side element and the low-side element with each other; and
      a second wiring portion coupled with the low-side element, and to which the second potential is to be supplied,
   wherein an operation period of the switching regulator includes:
      an ON period that turns on the high-side element, and that turns off the low-side element;
      a transition period that turns on the high-side element, and that turns on the low-side element; and
      an OFF period that turns off the high-side element, and that turns on the low-side element,
   where switch regulator includes a first region, and
   wherein the first region encloses the first wiring portion and the second wiring portion that are lined up with each other such that:
      during the transition period, a first direction in which a first electric current flows through the first wiring portion in the first region and a second direction in which a second electric current flows through the second wiring portion in the first region are opposite to each other; and
      during the OFF period, a third direction in which a third electric current flows through the second wiring portion in the first region and a fourth direction in which a fourth electric current flows through the first wiring portion in the first region are opposite to each other.

2. The electronic device according to claim 1,
   wherein the first wiring portion and the second wiring portion are formed in a first wiring layer of a wiring substrate,
   wherein the wiring substrate includes a second wiring layer located one layer below the first wiring layer, and wherein a maximum distance between the first wiring portion and the second wiring portion in the first region is less than a distance between the first wiring layer and the second wiring layer.

3. The electronic device according to claim 2, wherein the maximum distance is 0.1 mm or less.

4. The electronic device according to claim 1, wherein, in plan view, the second wiring portion is crossing to the high-side element.

5. The electronic device according to claim 1,
wherein the switching regulator includes:
an inductor coupled with the first wiring portion;
a third wiring portion coupled with the inductor, and to which a third potential is to be supplied; and
a capacitor coupled the third wiring portion and the second wiring portion with each other, and
wherein the second wiring portion has a second region lined up with the inductor.

6. The electronic device according to claim 5,
wherein the inductor is comprised of a winding, and
wherein a winding direction of the winding of the inductor is set such that a fifth direction in which a fifth electric current flows through the inductor and a sixth direction in which a sixth electric current flows in a sixth direction through the second wiring portion of the second region are opposite to each other.

7. The electronic device according to claim 1, further comprising:
a first semiconductor component including the high-side element;
a second semiconductor component including the low-side element; and
a wiring substrate including the first wiring portion and the second wiring portion.

8. The electronic device according to claim 7,
wherein the wiring substrate includes a power supply wiring portion to which the first potential is to be supplied,
wherein the first wiring portion is spaced apart from the power supply wiring portion, and
wherein the second wiring portion includes:
an extension portion passing through between the power supply wiring portion and the first wiring portion, and composing a part of the first region; and
a large area portion connected to the extension portion.

9. The electronic device according to claim 8,
wherein the first semiconductor component is arranged on the wiring substrate so as to straddle the extension portion of the second wiring portion, and arranged on the wiring substrate so as to connect the power supply wiring portion with the first wiring portion, and
wherein the second semiconductor component is arranged on the wiring substrate so as to connect the first wiring portion with the second wiring portion.

10. The electronic device according to claim 9,
wherein the wiring substrate includes an output wiring portion to which a third potential is to be supplied,
wherein the electronic device according to claim 9, further comprises:
an inductor arranged on the wiring substrate so as to connect the first wiring portion with the output wiring portion; and
one or more capacitors arranged on the wiring substrate so as to connect the large area portion of the second wiring portion with the output wiring portion.

11. The electronic device according to claim 10, wherein the large area portion has a second region lined up with the inductor.

12. The electronic device according to claim 11,
wherein the first wiring portion and the second wiring portion are formed in a first wiring layer of the wiring substrate,
wherein the wiring substrate includes a second wiring layer located one layer below the first wiring layer, and
wherein a maximum distance between the large area portion and the first wiring portion in the second region is less than a distance between the first wiring layer and the second wiring layer.

13. The electronic device according to claim 12, wherein a distance between the large area portion and the inductor in the second region is less than the maximum distance.

14. The electronic device according to claim 11,
wherein the first wiring portion, the second wiring portion, the power supply wiring portion and the output wiring portion are formed in a first wiring layer of the wiring substrate,
wherein the wiring substrate includes a second wiring layer located one layer below the first wiring layer,
wherein the wiring substrate includes an other wiring portion formed in the second wiring layer, and
wherein the second wiring portion is electrically connected with the other wiring portion by way of a via formed in a connection region between the extension portion and the large area portion.

15. The electronic device according to claim 10, wherein the large area portion of the second wiring portion is electrically connected with the output wiring portion by way of the one or more capacitors.

* * * * *